United States Patent
Chang et al.

(10) Patent No.: US 12,454,566 B2
(45) Date of Patent: Oct. 28, 2025

(54) CONSTRUCTION OF ENGINEERING BACTERIA FOR HIGH EXPRESSION OF RECOMBINANT HUMAN SERUM ALBUMIN

(71) Applicant: Shenzhen Protgen Ltd., Shenzhen (CN)

(72) Inventors: Guodong Chang, Beijing (CN); Xin Dou, Beijing (CN); Xiaobo Xiong, Beijing (CN); Wenchao Wang, Beijing (CN)

(73) Assignee: Shenzhen Protgen Ltd., Shenzhen (CN)

( * ) Notice: Subject to any disclaimer, the term of this patent is extended or adjusted under 35 U.S.C. 154(b) by 185 days.

(21) Appl. No.: 16/099,159

(22) PCT Filed: May 4, 2017

(86) PCT No.: PCT/CN2017/083079
§ 371 (c)(1),
(2) Date: Nov. 5, 2018

(87) PCT Pub. No.: WO2017/190671
PCT Pub. Date: Nov. 9, 2017

(65) Prior Publication Data
US 2019/0330707 A1    Oct. 31, 2019

(30) Foreign Application Priority Data

May 4, 2016    (CN) .......................... 201610289898.8

(51) Int. Cl.
| | | |
|---|---|---|
| C07K 14/765 | (2006.01) | |
| C12N 9/02 | (2006.01) | |
| C12N 15/81 | (2006.01) | |
| C12R 1/84 | (2006.01) | |
| C07K 14/395 | (2006.01) | |
| C12N 1/16 | (2006.01) | |

(52) U.S. Cl.
CPC .......... C07K 14/765 (2013.01); C12N 9/0051 (2013.01); C12N 15/81 (2013.01); *C07K 14/395* (2013.01); *C12N 1/165* (2021.05); *C12R 2001/84* (2021.05); *C12Y 502/01008* (2013.01); *C12Y 503/04001* (2013.01)

(58) Field of Classification Search
CPC .... C07K 14/00; C07K 14/395; C07K 14/765; C12N 1/165; C12N 9/0004; C12N 9/0051; C12N 9/90; C12N 15/81; C12N 15/815; C12R 2001/84; C12Y 502/01008; C12Y 503/04001
See application file for complete search history.

(56) References Cited

U.S. PATENT DOCUMENTS 5,578,466 A    11/1996 Hayano et al.

FOREIGN PATENT DOCUMENTS

| CN | 102766648 A | 11/2012 |
|---|---|---|
| CN | 104152484 A | 11/2014 |

OTHER PUBLICATIONS

Koyabashi et al. (Journal of Bioscience and Bioengineering, 2000, 89(1):55-61) (Year: 2000).*
Yu et al. (Appl Biochem Biotechnol, 2015, 175:535-548) (Year: 2015).*
Inan et al. (Biotechnology and Bioengineering, 2005, 93(4):771-778) (Year: 2005).*
Ahmad et al. (Appl. Microbiol. Biotechnol., 2014, 98:5301-5317) (Year: 2014).*
Invitrogen (Pichia Expression Kit manual, 2006) (Year: 2006).*
Wu et al. (Appl. Biochem. Biotechnol., 2014, 172:2400-2411) (Year: 2014).*
Shen et al. (Appl. Microbiol. Biotechnol., 2012, 96:763-772) (Year: 2012).*
Guan et al. (Yeast, 2016, 33:587-600) (Year: 2016).*
Aw et al. (Microbial Cell Factories, 2013, 12:128) (Year: 2013).*
Lodi, et al. "Secretion of human serum albumin by Kluyveromyces lactis overexpressing KIPDI1 and KIERO1." *Applied and Environmental Microbiology* 71.8 (2005): 4359-4363.
Qu, et al. "Effect of coexpressing protein disulfide isomerase on expression of IFNβ- HAS fusion protein in Pichia pastoris." *Chin J Biol* 23.4 (2010): 346-349. (with attached English-language abstract).
Damasceno et al., "Cooverexpression of chaperones for enhanced secretion of a single-chain antibody fragment in Pichia pastoris," *Appl Microbiol Biotechnol.* 74: 381-389, 2007.
Liu et al., "Optimization of the production of Aspergillus niger α-glucosidase expressed in Pichia pastoris," *World J Microbiol Biotechnol.* 29: 533-540, 2013.
Payne et al., "Modulation of Chaperone Gene Expression in Mutagenized *Saccharomyces cerevisiae* Strains Developed for Recombinant Human Albumin Production Results in Increased Production of Multiple Heterologous Proteins," *Applied and Environmental Microbiology* 74.24: 7759-7766, Dec. 2008.
Xu et al., "Analysis of unfolded protein response during single-chain antibody expression in *Saccaromyces cerevisiae* reveals different roles for BiP and PDI in folding," *Metabolic Engineering* 7: 269-279, 2005.
Gasser et al., "Protein folding and conformational stress in microbial cells producing recombinant proteins: a host comparative overview," *Microbial Cell Factories*, 7(11), 18 pages, 2008.
Lee et al., "Overexpression of HAC1 gene increased levels of both intracellular and secreted human kringle fragment in *Saccharomyces cerevisiae*," *Process Biochemistry*, 47(12): pp. 2300-2305, 2012.
Valkonen et al., "Effects of Inactivation and Constitutive Expression of the Unfolded-Protein Response Pathway on Protein Production in the Yeast *Saccharomyces cerevisiae*," *Applied and Environmental Microbiology*, 69(4): 2065-2072, 2003.

(Continued)

*Primary Examiner* — Jeremy C Flinders
(74) *Attorney, Agent, or Firm* — Klarquist Sparkman, LLP

(57) ABSTRACT

Provided is a method for the high expression of a recombinant human serum albumin, characterized in comprising the step of co-expressing: (a) a human serum albumin gene, and (b) one or more rHSA expression promoting factor genes in a yeast host cell.

12 Claims, 7 Drawing Sheets

Specification includes a Sequence Listing.

(56) References Cited

OTHER PUBLICATIONS

Bao and Fukuhara, "Secretion of human proteins from yeast: stimulation by duplication of polyubiquitin and protein disulfide isomerase genes in Kluyveromyces lactis," *Gene*, 272:103-110, 2001.

Raschmanová et al., "Engineering of the unfolded protein response pathway in *Pichia pastoris*: enhancing production of secreted recombinant proteins," *Applied Microbiology and Biotechnology*, 105:4397-4414, 2021.

Damasceno et al., "Cooverexpression of chaperones for enhanced secretion of a single-chain antibody fragment in Pichia pastoris," *Appl Microbiol Biotechnol.* 74(2):381-389, 2007 (Abstract only).

\* cited by examiner

```
   1  GATGCACACA AGAGTGAGGT TGCTCATCGG TTTAAAGATT TGGGAGAAGA AAATTTCAAA GCCTTGGTGT TGATTGCCTT TGCTCAGTAT
  91  CTTCAGCAGT GTCCATTTGA AGATCATGTA AAATTAGTGA ATGAAGTAAC TGAATTTGCA AAAACATCTG TTGCTGATGA GTCAGCTGAA
 181  AATTCTGACA AATCACTTCA TACCCTTTTT GGAGACAAAT TATGCACAGT TGCAACTCTT CGTGAAACCT ATGGTCAAAT GGCTGACTGC
 271  TGTGCAAAAC AAGAACCTGA GAGAAATGAA TGCTTCTTGC AACACAAAGA TGACAACCCA AACCTCCCCC GATTGGTGAG ACCAGAGGTT
 361  GATGTGATGT GCACTGCTTT TCATGACAAT GAAGAGACAT TTTTGAAAAA ATACTTATAT GAAATTGCCA GAAGACATCC TTACTTTTAT
 451  GCCCCGGAAC TCCTTTTCTT TGCTAAAAGG TATAAAGCTG CTTTTACAGA ATGTTGCCAA GCTGCTGATA AAGCTGCCTG CCTGTTGCCA
 541  AAGCTCGATG AACTTCGGGA TGAAGGGAAG GCTTCGTCTG CCAAACAGAG ACTCAAGTGT GCCAGTCTCC AAAAATTTGG AGAAAGAGCT
 631  TTCAAAGCAT GGGCAGTAGC TCGCCTGAGC CAGAGATTTC CAAAGCTGA GTTTGCACAA GTTTCCAAGT TAGTCACACA TCTTACCAAA
 721  GTCCACACGG AATGCTGCCA TGGAGATCTC CTTGAATGTG CTGATCACAG GGCGGACCTT GCCAAGTATA TCTGTGAAAA TCAAGATTCG
 811  ATCTCCAGTA AACTGAAGGA ATGCTGTGAA AAACCTCTGT TGGAAAAATC CCACTGCATT GCCGAAGTGG AAAATGATGA GATGCCTGCT
 901  GACTTGCCTT CATTAGCTGC TGATTTTGTT GAAAGTAAGG ATGTTTGCAA AAACTATGCT GAGGCAAAGG ATGTCTTCCT GGGGCATGTTT
 991  TTGTATGAAT ATGCAAGAAG GCATCCTGAT TACTCTGTCG TGCTGCTGCT GAGACTTGCC AAGACATATG AAACCACTCT AGAGAAGTGC
1081  TGTGCCGCTG CAGATCCTCA TGAATGCTAT GCCAAAGTGT TCGATGAATT TAAACCTCTT GTGGAAGAGC CTCAGAATTT AATCAAACAA
1171  AATTGTGAGC TTTTTGAGCA GCTTGGAGAG TACAAATTCC AGAATGCGCT ATTAGTTCGT TACACCAAGA AAGTACCCCA AGTGTCAACT
1261  CCAACTCTTG TAGAGGTCTC AAGAAACCTA GGAAAAGTGG GCAGCAAATG TTGTAAACAT CCTGAAGCAA AAACAATGCC CTGTGCAGAA
1351  GACTATCTAT CCGTGGTCCT GAACCAGTTA TGTGTGTTGC ATGAGAAAAC GCCAGTAAGT GACAGAGTCA CCAAATGCTG CACAGAATCC
1441  TTGGTGAACA GGCCACCATG CTTTTCAGCT CTGGAAGTCG ATGAAACATA CGTTCCCAAA GAGTTTAATG CTGAAACATT CACCTTCCAT
1531  GCAGATATAT GCACACTTTC TGAGAAGGAG AGACAAATCA AGAAACAAAC TGCACTTGTT GAGCTCGTGA AACACAAGCC AAGGCAACA
1621  AAAGAGCAAC TGAAAGCTGT TATGGATGAT TTCGCAGCTT TTGTAGAGAA GTGCTGCAAG GCTGACGATA AGGAGACCTG CTTTGCCGAG
1711  GAGGGTAAAA AACTTGTTGC TGCAAGTCAA GCTGCCTTAG GCTTATAA
```

FIG. 1

```
   1  DAHKSEVAHR FKDLGEENFK ALVLIAFAQY LQQCPFEDHV KLVNEVTEFA KTCVADESAE NCDKSLHTLF
  71  GDKLCTVATL RETYGEMADC CAKQEPERNE CFLQHKDDNP NLPRLVRPEV DVMCTAFHDN EETFLKKYLY
 141  EIARRHPYFY APELLFFAKR YKAAFTECCQ AADKAACLLP KLDELRDEGK ASSAKQRLKC ASLQKFGERA
 211  FKAWAVARLS QRFPKAEFAE VSKLVTDLTK VHTECCHGDL LECADDRADL AKYICENQDS ISSKLKECCE
 281  KPLLEKSHCI AEVENDEMPA DLPSLAADFV ESKDVCKNYA EAKDVFLGMF LYEYARRHPD YSVVLLLRLA
 351  KTYETTLEKC CAAADPHECY AKVFDEFKPL VEEPQNLIKQ NCELFEQLGE YKFQNALLVR YTKKVPQVST
 421  PTLVEVSRNL GKVGSKCCKH PEAKRMPCAE DYLSVVLNQL CVLHEKTPVS DRVTKCCTES LVNRRPCFSA
 491  LEVDETYVPK EFNAETFTFH ADICTLSEKE RQIKKQTALV ELVKHKPKAT KEQLKAVMDD FAAFVEKCCK
 561  ADDKETCFAE EGKKLVAASQ AALGL
```

FIG. 2

```
   1  ATGAGGATAG TAAGGAGCGT AGCTATCGCA ATAGCCTGTC ATTGTATAAC AGCGTTAGCA AACCCTCAAA TCCCTTTTGA CGGCAACTAC
  91  ACCGAGATCA TCGTGCCAGA TACCGAAGTT AACATCGGAC AGATTGTAGA TATTAACCAC GAAATAAAAC CCAAACTGGT GGAACTGGTC
 181  AACACAGACT TCTTCAAATA TTACAAATTA AACCTATGCA AACCATGTCC GTTTTGGAAT GGTGATCAGG GATTCTGCAA GTATAAGGAT
 271  TGCTCTCTCG ACTTTATCAC TGATTGCTCT CAGGTGCCTG ATATCTGGCA ACCAGACCAA TTGGGTAAGC TTGCACATAA CACGGTACAT
 361  AAGGATAAGG CCAAGATGA AAATGAGCTG TCCTCAAATG ATTATTGCGC TTTGGATAAA GACGACGATG AAGATTTAGT ATATGTCAAT
 451  TTGATTGATA ACCCTGAAAG ATTCACCGGT TATGGTGGTC AGCAATCTGA ATCTATTTGG ACTGCGGTCT ATGATGAGAA CTGTTCCAG
 541  CCGAATGAAG GATCACAATT GGGTCAAGTT GAAGACCTCT GTTGGAGAA ACAGATCTTT TACCGATTGG TTTCTGGTTT GCATTCTAGT
 631  ATCTCCACCC ACCTCACAAA CGAATATCTG AATTTGAAAA ATGGAGCATA CGAACCAAAT TTGAAACAGT TCATGATCAA AGTTGGGTAT
 721  TTTACTGAAA GAATTCAAAA CTTACATCTC AATTATGTCC TTGTATTGAA CTCACTAATA AAGCTACAAG AATACAATCT TATCGACAAT
 811  CTACCTCTCG ATCACTCTTT GAAAGCTGGT CTTAGCGGTT AATATCTCA AGGAGCACAG GCTATTAACC AGAGCTCTGA TGATTATCTA
 901  TTTAACGAGA AGGTTCTTTT CCAAAATGAC CAAAATGATG ATTTGAAAAA TGAATTCCGT GACAAATTCC GCAACGTGAC TAGATTAATG
 991  GATTGTGTCC ATTGCCAGAG ATGCAAATTA TGGGGAAAAT TGCAAACTAC AGGGTACGGG ACTGCATTGA AGATTCTATT TGATTTGAAG
1081  AATCCTAATG ACTCCATCAA TTTAAAGAGA GTTGAGTTAG TTGCTCTAGT CAACACATTC CATAGATTGT CCAAATCTGT TGAAAGCATT
1171  GAAAACTTTG AAAAACTATA TAAGATTCAA CCGCCAACGC AGGATCGTGC ATCAGCGTCG TCCGAATCCT TAGGCCTTTT CGATAACGAA
1261  GATGAACAAA ATCTCCTCAA CTCGTTTTCG GTTGATCAGG CAGTCATTTC ATCGAAAGAG GCACCGAAA AATCAAAAG CAAACCTCTT
1351  CGAAAGCCCG CATATAAACA AAACAGTTCT CCATCATTGG GTTCAAAATC TATCAAACAA GCATTCCATG AAGAACTTCA CGCATTTATT
1441  GATGCAATTG GATTTATATT GAACTCTTAC AGGACTTTGC CCAAGCTGTT GTACACACTT TCCTCGTTA AATCATCTGA ATTATGGGAC
1531  ATTTTCATTG GCACTCAAAG GCACCGAGAT ACCACATATA GAGTAGACTT CTAA
```

FIG. 3

```
  1  MRIVRSVAIA IACHCITALA NPQIPFDGNY FEIIVPDTEV NIGQIVDINH EIKPKLVELV NTDFFKYYKL
 71  NLWKPCPFWN GDEGFCKYFD CSVDFITDWS QVPDIWQPDQ LGKLGDNTVH KDKGQDENEL SSNDYCALDK
141  DDDEDLVYVN LIDNPERFTG YGGQQSESIW TAVYDKNCFQ PNEGSQLGQV EDLCLEKQIF YRLVSGLHSS
211  ISTHLTNEYL NLKNGAYEPN LKQFMIKVGY FTERIQNLHL NYVLVLKSLI KLQEYNVIDN LPLDDSLFAC
281  LSGLISQGAQ GINQSSDDYL FNEKVLPQND QNDDLKNEFR DKFPNVTRLM DCVHCERCKL WGKLQTTGYG
351  TALKILFDLK NPNDSINLRD VELVALVNTP HRLSKSVESI ENFEKLYKIQ PPTQDPASAS SESLGLFDNR
421  DRQNLLNSFS VDQAVISSKE APEEIKSKPV GKAAYKQNSC PSLGSKSIKE AFHEELHAFI DAIGFILNSY
491  RTLPKLLYTL FLVKSSELWD IFIGTQRHED ITYRVDL
```

FIG. 4

```
  1  ATGCCCCTAC ATTCTTCTCA TAAGACAGCT AGCCCACTTC CACCTCCTAA AACAGCAAAG ACGGAAGAAG AAAAGGAGCA GCGTCCACTC
 91  GAACGTATCC TACGTAATAG GAGAGCGGCC CATGCTTCCA GAGAGAAGAA ACGAAGACAC GTTGAATTTC TGGAAAACCA CGTCGTCGAC
181  CTGGAATCTG CACTTCAAGA ATCAGCCAAA GCCACTAACA AGTTGAAAGA AATACAAGAT ATCATTGTTT CAAGGTTGGA AGCCTTAGGT
271  GGTACCGTCT CAGATTTGGA TTTAACAGTT CCGGAAGTCG ATTTTCCCAA ATCTTCTGAT TTGGAACCCA TGTCTGATCT CTCAACTTCT
361  TCGAAATCGG AGAAAGCATC TACATCCACT CGCAGATCTT TGACTGAGGA TCTGGACGAA GATGACGTCG CTGAATATGA CGACGAAGAA
451  GAGGACGAAG AGTTACCCAG GAAAATGAAA GTCTTAAACG ACAAAAACAA GAGCACATCT ATCAAGCAGG AGAAGTTGAA TGAACTTCCA
541  TCTCCTTTGT CATCCGATTT TCAGACGTA GATGAAGAAA GTCAACTCT CACACATTTA AAGTTGCAAC AGCAACAACA ACAACCAGTA
631  GACAATTATG TTTCTACTCC TTTGAGTCTT CCGGAGGATT CAGTTGATTT TATTAACCCA GGTAACTTAA AAATAGAGTC CGATGAGAAC
721  TTCTTGTTGA GTTCAAATAC TTTACAAATA AAACACGAAA ATGACACCGA CTACATTACT ACAGCTCCAT CAGGTTCCAT CAATGATTTT
811  TTTAATTCTT ATGACATTAG CGAGTCGAAT CGGTTGCATC ATCCAGCAGC ACCTTTTACC GCTAATGCAT TTGATTTAAA TGACTTTGTA
901  TTCTTCCAGG AATAA
```

FIG. 5

```
  1  MPVDSSHKTA SPLPPEKPAK TEEEKEQRRV ERILRNPRAA HASREKKRRH VEFLENHVVD LESALQESAK
 71  ATNKLREIQD IIVSRLEALG GTVSDLDLTV PEVDFPRSSD LEPMSDLSTS SKSEKASTST RRSLTEDLDE
141  DDVAEYDDEE EDEELPPRKM VLNDRNKSTS IKQEKLNELP SPLSSDFSDV DEEKSTLTHL KLQQQQQPV
211  DNYVSTPLSL PEDSVDFINP GNLKIESDEN FLLSSNTLQI KHENDTDYIT TAPSGSIMDF FNSYDISESN
281  RLHHPAAPFT ANAFDLNDFV FFQE
```

FIG. 6

```
   1  ATGCAATTCA ACTGGAATAT TAAAACTGTG GCAAGTATTT TGTCCGCTCT CACACTAGCA CAAGCAAGTG ATCAGGAGGC TATTGCTCCA
  91  GAGGACTCTC ATGTCGTCAA ATTGACTGAA GCCACTTTTG AGTCTTTCAT CACCAGTAAT CCTCACGTTT TGGCAGAGTT TTTTGCCCCT
 181  TGGTGTGGTC ACTGTAAGAA GTTGGGCCCT GAACTTGTTT CTGCTGCCGA GATCTTAAAG GACAATGAGC AGGTTAAGAT TGCTCAAATT
 271  GATTGTACGG AGGAGAAGGA ATTATGTCAA GGCTACGAAA TTAAAGGGTA TCCTACTTTG AAGGTGTTCC ATGGTGAGGT TGAGGTCCCA
 361  AGTGACTATC AAGGTCAAAG ACAGAGCCAA AGCATTGTCA GCATTATGTC AAAGGAGAGT TTACCCCCTG TCAGTGAAAT CAATGCAACC
 451  AAAGATTTAG ACGACACAAT CGCCGAGGCA AAAGAGCCCG TGATTGTGCA AGTACTACCG GAACATGCAT CCAACTTGGA ATCTAACACC
 541  ACATTTTACG CAGTTGCCGG TACTCTCAGA GAGAAATTCA CTTTTGTCTC CACTAAGTCT ACTGATTATG CCAAAAAATA CACTAGCGAC
 631  TCGACTCCTG CCTATTTGCT TGTCAGACCT GGCGAGGAAC CTAGTGTTTA CTCTGGTGAG GAGTTAGATG AGACTCATTT GGTGCACTGG
 721  ATTGATATTG AGTCCAAACC TCTATTTGGA GACATTGACG GATCCACCTT CAAATCATAT GCTGAAGCTA ACATCCCTTT AGCCTACTAT
 811  TTCTATGAGA ACGAAGAACA ACGTGCTGCT GCTGCCGATA TTATTAAACC TTTTGCTAAA GAGCAACGTG GCAAAATTAA CTTTGTTGGC
 901  TTAGATGCCG TTAAATTCGG TAAGCATGCC AAGAACTTAA ACATGGATGA AGAGAAACTC CCTCTATTTG TCATTCATGA TTTTGGTGAGC
 991  AACAAGAAGT TTGGAGTTCC TCAAGACCAA GAATTGACGA ACAAAGATGT GACCGAGCTG ATTGAGAAAT TCATCGCAGG AGAGGCAGAA
1081  CCAATTCTGA AATCAGGACC AATTCCAGAA ATTCAAGAAG AGAAAGTCTT CAAGCTAGTC GGAAAGGGCC ACGATGAAGT TGTCTTCGAT
1171  GAATCTAAAG ATGTTCTAGT CAAGTACTAC GCCCCTTGGT GTGGTCACTG TAAGCAGAATG GCTCCTGCTT ATGCGGAATT GGCTACTCTT
1261  TACGCCAATG ATGAGGATGC CTCTTCAAAG GTTGTGATTG CAAAACTTGA TCACACTTTG AACGATGTCG ACAACGTTGA TATTCAAGGT
1351  TATCCTACTT TGATCGTTTA TCCAGCTGGT GATAAATCCA ATCCTCAACT GTATGATGGA TCTCGTGACC TAGAATCATT GGCTGAGTTT
1441  GTAAAGGAGA GAGGACCCCA CAAAGTGAT GCCCTAGCAC TCAGACCAGT CGAGGAAGAA AAGGAAGCTG AAGAAGAAGC TGAAAGTGAG
1531  GCAGACGCTC ACGACGAGCT TTAA
```

FIG. 7

```
  1  MQFNWNIKTV ASILSALTLA QASDQEAIAP EDSHVVKLTE ATFESPITSN PHVLAEFFAP WCGHCKKLGP
 71  ELVSAAEILK DNEQVKIAQI DCTEEKELCQ GYEIKGYPTL KVFHGEVEVP SDYQGQRQSQ SIVSYMLKQS
141  LPPVSEINAT KDLDDTIAKA KEPVIVQVLP EDASNLESNT TFYGVACTLR EKFTFVSTKS TDYAKKYTSD
211  STPAYLLVPP GEKPSVYSGE ELDETHLVHW IDIESKPLFG DIDGSTFKSY AEANIPLAYY FYENEEQRAA
281  AADIIKPFAK EQRGKINFVG LDAVKFGKHA KNLNMDEEKL PLFVIHDLVS MKKFGVPQDQ ELTNKDVTEL
351  IEKPIAGEAE PIVKSEPIPE IQEEKVFKLV GKAHDEVVFD ESKDVLVKYY APWCGHCKRM APAYEELATL
421  YANDEDASSK VVIAKLDHTL NDVDNVDIQG YPTLILYPAG DKSNPQLYDG SRDLESLAEF VKERGTHKVD
491  ALALRPVEEE KEAEEEAESE ADAHDEL
```

FIG. 8

```
  1  ATGGAATIAA CCGCATTGCG CAGCAGCAAC CCTAACACCA TGATAGACCA ACCATTGGGC CGTATTGTCT TCGAGTTATA CGATGATGTT
 91  CCAAAGACCA TTGAGAACTT CAGAGCTCTG TGTACTGGAG AGAAGGGTTA CGGGTACAAA GACTCCATTT TTCACAGAGT CATCCCTCAA
181  TTCATGTTGC AAGGTGGTCA TTTCACCAAG TTCAACGGAA CTGGTGGCAA ATCAATCTAT GGTCAGAAGT TCGCTGACGA GAACTTCATC
271  CACAAGCACA CCAAGCCAGG TTTGCTGTCA ATGGCTAACG CCGGTCCAAA CACCAATGGT TCCCAATTTT TCATTACCAC TGTTCCATGT
361  CCTTGGTTAG ATGGTAAGCA CGTTGTATTT GGTGAGGTCG TCGACGGGCT GGACGTTGTC TCCAAGATCG AGACCTTGGG ATCATCTTCT
451  GGTGCTACCA AGACCCAGTT CAAGATCACC AACTCCGGTG AGTTGTAA
```

FIG. 9

1   MELTALRSSN PNTMIDQPLG RIVFELYDDV PKTIENFRAL CTGEKGYGYK DSIFHRVIPQ FMLQGGDFTK
71  FNGTGGKSIY GEKFADENFI HKHTKPGLLS MANAGPNTNG SQFFITTVPC PWLDGKHVVF GEVVDGLDVV
141 SKIETLGSSS CATKTQLKIT NSGEL

FIG. 10

```
   1 ATGCTGTCGT TAAAACCATC TTGGCTGACT TTGGCGGCAT TAATGTATGC CATGCTATTG GTCGTAGTGC CATTTGCTAA ACCTGTTAGA
  91 GCTGACGATG TCGAATCTTA TGGAACAGTG ATTGGTATCG ATTTGGGTAC CACGTACTCT TGTGTCGGTG TGATGAAGTC GGGTCGTGTA
 181 GAAATTCTTG CTAATGACCA AGGTAACAGA ATCACTCCTT CCTACGTTAG TTTCACTGAA GACGAGAGAC TGGTTGGTGA TGCTGCTAAG
 271 AACTTAGCTG CTTCTAACCC AAAAAACACC ATCTTTGATA TTAAGAGATT GATCGGTATG AAGTATGATG CCCCAGAGGT CCAAAGAGAC
 361 TTGAAGCGTC TTCCTTACAC TGTCAAGAGC AAGAACGGCC AACCTGTCGT TTCTGTCGAG TACAAGGGTG AGGAGAAGTC TTTCACTCCT
 451 GAGGAGATTT CCGCCATGGT CTTGGGTAAG ATGAAGTTGA TCGCTGAGGA CTACTTAGGA AAGAAAGTCA CTCATGCTGT CGTTACCGTT
 541 CCAGCCTACT TCAACGACGG TCAACGTCAA GCCACTAAGG ATGCCGGTCT CATCGCCGGT TTGACTGTTC TGAGAATTGT GAACGAGCCT
 631 ACCGCCGCTG CCCTTGCTTA CGGTTTGGAC AAGACTGGTG AGGAAAGACA GATCATCGTC TACGACTTGG GTGGAGGAAC CTTCGATGTT
 721 TCTCTGCTTT CTATTGAGGG TGGTGCTTTC GAGGTTCTTG CTACCGCCGG TGACACCCAC TTGGGTGGTG AGGACTTTGA CTACAGAGTT
 811 GTTGCCACT TCGTTAAGAT TTTCAAGAAG AAGCATAACA TTGACATCAG CAACAATGAT AAGGCTTTAG GTAAGCTGAA GAGAGAGGTC
 901 GAAAAGGCCA AGCGTACTTT GTCTTCCCAG ATGACTACCA GAATTGAGAT TGACTCTTTC GTCGACGGTA TCGACTTCTC TGAGCAACTG
 991 TCTAGAGCTA AGTTTGAGGA GATCAACATT GAATTATTCA AGAACACAGT GAAACCAGTT GAACAAGTCC TCAAAGACGC TGGTGTCAAG
1081 AAATCTGAAA TTGATCACAT TGTCTTGGTT GGTGGTTCTA CCAGAATCCC AAAGGTTCAA CAATTATTGG ACGATTACTT TGACGGAAAG
1171 AAGGCTTCTA AGGGAATAA CCCAGATGAA GCTGTCGCAT ACGGTGCCGC TGTTCAGGCT GGTGTTTTGT CTGGTGAGGA AGGTGTCGAT
1261 GACATCGTCT TGCTTGATGT GAACCCCCTA ACTCTGGGTA TCGACACTAC TGGTGGCGTT ATGACTACCT TAATCAACAG AAACACTGCT
1351 ATCCCAACTA AGAAATCTCA AATTTTCTCC ACTGCTGCTG CAACCAGCC AACTGTGTTG ATTCAAGTTT ATGAGGGTGA GAGAGCCTTG
1441 GCTAAGGACA CAACTTGCT TGGTAAATTC GAGCTGACTG GTATTCCACC AGCTCCAAGA GGTACTCCTC AAGTTGAGGT TACTTTTGTT
1531 TTAGACGCTA ACGGAATTTT GAAGGTCTCT GCCACCGATA AGGGAACTGG AAAATCCGAG TCCATCACCA TCAACAATGA TCGTGGTAGA
1621 TTGTCCAAGG AGGACGTTGA CCGTATGGTT GAAGAGGCCG AGAAGTACGC CGCTGAGGAT GCTGACACTAA GACAAAAGAT TGAGGCTAGA
1711 AACGCTCTGG AGAACTACGC TCATTCCCTT AGGAACCAAG TTACTGATGA CTCTGAAACC GGGCTTGCTT CTAAATTGGA CGAGGACGAC
1801 AAAGAGACAT TGACACATGC CATCAAAGAT ACCCTAGAGT TCTTCGAAGA CAACTTCGAC ACCGCAACCA AGCAACAATT AGACGAACAA
1891 AGAGAAAAGC TTTCCAAGAT TGCTTACCCA ATCACTTCTA AGCTATACGG TGCTCCAGAG GGTGGTACTC CACCTGGTGG TCAAGGTTTT
1981 GACGATGATG ATGCAGACTT TGACTACGAC TATGACTATC ATGATGATGA GTTGTAG
```

FIG. 11

```
  1  MLSLKPSWLT LAALMYAMLL VVVPFAKPVP ADDVESYGTV IGIDLGTTYS CVGVMKSGRV EILANDQGNR
 71  ITPSYVSFTE DERLVGDAAK NLAASNPKNT IFDIKRLICM KYDAPEVQRD LKRLPYTVKS PNGQPVVSVE
141  YKGEEKSFTP EEISAMVLGK MKLIAEDYLG KKVTHAVVTV PAYFNDAQRQ ATKDAGLIAG LTVLRIVNEP
211  TAAALAYGLD KTGERQIIV YDLGGGTFDV SLLSIEGGAF EVLATAGDTH LGGEDFDYRV VRHFVKIFKK
281  KHNIDISNND KALGKLKREV EKAKRTLSSQ MTTRIEIDSF VDGIDFSEQL SRAKFEEINI ELFKKTLKPV
351  EQVLKDAGVK KSEIDDIVLV GGSTRIPKVQ QLLEDYFDGK KASKGINPDE AVAYGAAVQA GVLSGEEGVD
421  DIVLLDVNPL TLGIETTGGV MTTLINRNTA IPTEKSQIFS TAADNQPTVL IQVYEGERAL AKDNNLLGKF
491  ELTGIPPAPR GTPQVEVTFV LDANGILKVS ATDKGTGKSE SITINNDRGR LSKEEVDRMV EEAEKYAAKD
561  AALREKIEAR NALENYAHSL RNQVTDDSET GLGSKLDEDD KETLTDAIKD TLEFLEDNFD TATKEELDEQ
631  REKLSKIAYP ITSKLYGAPE GGTPPGGQGF DDDDGDFDYD YDYDHDEL
```

FIG. 12

CONSTRUCTION OF ENGINEERING BACTERIA FOR HIGH EXPRESSION OF RECOMBINANT HUMAN SERUM ALBUMIN

CROSS REFERENCE TO RELATED APPLICATIONS

This is the U.S. National Stage of International Application No. PCT/CN2017/083079, filed May 4, 2017, which was published in Chinese, which in turn claims the benefit of Chinese Application No. 201610289898.8, filed May 4, 2016. The prior application is incorporated herein in its entirety.

FIELD OF THE INVENTION

The present invention relates to recombinant production of human serum albumin, in particular, the present invention relates to a method for highly producing human serum albumin by co-expressing human serum albumin and one or more human serum albumin expression promoting factors in a yeast cell.

BACKGROUND OF THE INVENTION

Human serum albumin (HSA) is the most abundant protein in human blood, accounting for about 60% of total plasma proteins. It has important physiological functions, can maintain blood osmotic pressure, and is an important carrier for transporting endogenous and exogenous substances and an important blood buffer component. In addition, HSA can also be used as an additive component of cell culture media, a pharmaceutical excipient, etc., and has important application value. At present, there are two main sources of HSA: one is to extract from plasma. Due to the shortage of plasma in China and the risk of viral infection such as AIDS and hepatitis, the HSA obtained by this method cannot meet the huge market demand. The other is recombinant preparation utilizing bioengineering techniques. Human serum albumin recombinantly produced by bioengineering technology is called recombinant human serum albumin (rHSA). Wherein, the technology of expressing rHSA by yeast is the most widely studied and mature. U.S. Pat. No. 5,683,893 discloses a method for mutating a *Pichia* alcohol oxidase (AOX) promoter to enhance expression of rHSA in yeast. Chinese patent application 200510068171.9, filed on Apr. 29, 2005, discloses a method for construction and fermentation of a rHSA yeast strain, the expression level of which can reach 10 g/L of medium supernatant. However, the above methods still have the defects of low expression of rHSA, long fermentation time and low production efficiency, thus it is necessary to find a new method to construct a more productive engineering strain.

*Pichia* has a post-translational modification function for eukaryotic proteins, so that foreign proteins can be correctly folded, assembled and secreted extracellularly after expression. Meanwhile, *Pichia* can effectively utilize methanol as a single carbon source for high-density fermentation. Therefore, *Pichia* has been widely used for the expression of foreign proteins. However, *Pichia* generally has a long fermentation cycle, high production cost, and is prone to contamination and protein degradation. Therefore, shortening the fermentation time and reducing the cost have become research hotspots of the expression system.

Endoplasmic reticulum (ER) of yeast is an important site for protein folding into natural conformation and post-translational modification such as glycosylation and phosphorylation. When there are a large number of unfolded proteins in the endoplasmic reticulum, unfolded protein response (UPR) is induced, which in turn activates downstream expressions of molecular chaperones and folding enzymes, and endoplasmic reticulum-related protein degradation pathways. As a self-regulating mechanism, UPR plays an important role in yeast growth and expression of secreted proteins (Graham Whyteside, et al. FEBS Letters 2011; 585: 1037-1041). Transcriptional activator HAC1 acts as a regulator of yeast UPR and regulates the expression of a series of proteins related to UPR, including binding protein KAR2, protein disulfide isomerase (PDI), endoplasmic reticulum oxidoreductin-1 (ERO1), peptidyl-prolyl cis-trans isomerase (PPI), and the like, which play important roles in helping the expression and secretion of proteins of interest. Chinese patent application No. 201310095971.4, filed on Mar. 22, 2013, discloses a method for co-expressing PDI with *Aspergillus niger* α-glucosidase to increase the expression level of the protein of interest. Chinese patent application No. 200780026864.9, filed on May 16, 2007, discloses a method for enhancing the expression of HAC1 of methanol assimilation yeast (*Ogataea minuta*), and the obtained engineering strain has a high protein secretion ability. Tiziana Lodi et al. reported that ERO1 contributes to the secretion of rHSA in *Kluyveromyvces lactis* (Tiziana Lodi. et al. AEM 2005: 71: 4359-4363). Furthermore, co-expression with KAR2 in *Pichia* has doubled the expression of the human single-chain antibody fragment (A33scFv) (Leonardo M. Damasceno, et al. Appl Microbiol Biotechnol, 2007; 74: 381-389).

SUMMARY OF THE INVENTION

The present invention provides a method for highly expressing recombinant human serum albumin, which comprises a step of co-expressing (a) a human serum albumin gene and (b) one or more rHSA expression promoting factor genes in a yeast host cell.

When the exogenous human serum albumin gene and the rHSA expression promoting factor gene are introduced into the yeast host cell, the expression level of rHSA is significantly increased.

The present invention also provides an engineered fungus for highly expressing recombinant human serum albumin, wherein the engineered fungus is yeast, and comprises: (a) a human serum albumin gene and (b) one or more rHSA expression promoting factor genes.

In some embodiments, wherein the yeast is *Pichia*; preferably, the yeast is *Pichia pastoris*.

In some embodiments, the rHSA expression promoting factor is selected from the group consisting of transcriptional activator HAC1, binding protein KAR2, protein disulfide isomerase (PDI), endoplasmic reticulum oxidoreductase (ERO1), and peptidyl-prolyl cis-trans isomerase (PPI).

In some embodiments of the present invention, the following combinations are co-expressed in the yeast host cell:
rHSA and ERO1;
rHSA and PDI;
rHSA, PDI and HAC1;
rHSA, PPI and KAR2: or
rHSA, PDI, PPI and HAC1.

In some embodiments, the human serum albumin gene of the present invention may be transformed into the yeast host cell by a plasmid: and the rHSA expression promoting factor gene may be transformed into the yeast host cell by one, two or more plasmids.

In some embodiments, it is not necessary to inactivate the original rHSA expression promoting factor gene in the host genome in the engineered fungus of the present invention, and thus the obtained engineering fungus can contain both the transferred HSA gene and rHSA expression promoting factor gene and the original rHSA expression promoting factor gene in the host cell.

In some embodiments of the present invention, the engineered fungus of the present invention can highly express rHSA, wherein the expression level of rHSA in the co-expressing strain is significantly increased, up to 18.2 g/L of fermentation supernatant, which lays a solid foundation for large-scale industrial production of rHSA.

BRIEF DESCRIPTION OF THE DRAWINGS

FIG. 1 shows a DNA sequence encoding HSA. SEQ ID NO: 13 is shown.

FIG. 2 shows an amino acid sequence of HSA encoded by the DNA sequence shown in FIG. 1. SEQ ID NO: 14 is shown.

FIG. 3 shows a DNA sequence encoding *Pichia* ERO1. SEQ ID NO: 15 is shown.

FIG. 4 shows an amino acid sequence of ERO1 encoded by the DNA sequence shown in FIG. 3. SEQ ID NO: 16 is shown.

FIG. 5 shows a DNA sequence encoding *Pichia* HAC1. SEQ ID NO: 17 is shown.

FIG. 6 shows an amino acid sequence of HAC1 encoded by the DNA sequence shown in FIG. 5. SEQ ID NO: 18 is shown.

FIG. 7 shows a DNA sequence encoding *Pichia* PDI. SEQ ID NO: 19 is shown.

FIG. 8 shows an amino acid sequence of PDI encoded by the DNA sequence shown in FIG. 7. SEQ ID NO: 20 is shown.

FIG. 9 shows a DNA sequence encoding *Pichia* PPI. SEQ ID NO: 21 is shown.

FIG. 10 shows an amino acid sequence of PPI encoded by the DNA sequence shown in FIG. 9. SEQ ID NO: 22 is shown.

FIG. 11 shows a DNA sequence encoding *Pichia* KAR2. SEQ ID NO: 23 is shown.

FIG. 12 shows an amino acid sequence of KAR2 encoded by the DNA sequence shown in FIG. 11. SEQ ID NO: 24 is shown.

SEQUENCE LISTING

Figure 13:
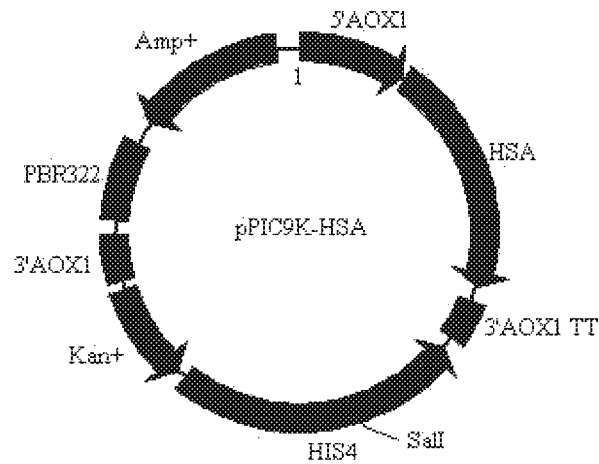
FIG. 13 shows a rHSA *Pichia* secretion expression vector.

The Sequence Listing is submitted as an ASCII text file in the form of the file named "Sequence.txt" (~40 Kb), which was created on Apr. 11, 2019, which is incorporated by reference herein.

DETAILED DESCRIPTION OF THE INVENTION

The term "rHSA expression promoting factor" as used herein refers to various protein factors capable of promoting the expression of rHSA, the source of which is not limited to a particular species. Specifically, proteins having molecular chaperone activity, such as KAR2; folding enzymes such as PDI; and transcriptional regulators, such as HAC1 and the like are included.

Specific rHSA expression promoting factors particularly suitable for the present invention include: transcriptional activator HAC1, binding protein KAR2, protein disulfide isomerase (PDI), endoplasmic reticulum oxidoreductase (ERO1), and peptidyl-prolyl cis-trans isomerase (PPI) and the like.

The source of the "rHSA expression promoting factor" is not limited to a particular species. For example, an rHSA expression promoting factor derived from *Saccharomyces cerevisiae*, such as PDI, can function well in *Pichia*.

Those skilled in the art will appreciate that the "rHSA expression promoting factor" also includes a protein or an active fragment having a substitution, addition or deletion of one or several amino acid residues in amino acid sequence compared to the above expression promoting factor, and having substantially similar biological functions. It may also include modified products, fusion proteins and complexes containing these proteins or active fragments thereof.

Preferably, the rHSA expression promoting factor is derived from the host cell. For example, the rHSA expression promoting factor from *Pichia* is preferably introduced into *Pichia* host cell for expression.

Those skilled in the art will appreciate that different combinations of different types of promoting factors can produce different technical effects. For example, the simultaneous addition of the transcriptional regulator HAC1 and the folding enzyme PDI results in better expression of rHSA than PDI alone.

The rHSA expression promoting factor may be introduced alone or in combination.

For example, in some embodiments of the present invention, an rHSA expression promoting factor (including ERO1, HAC1, KAR2, PDI, PPI, etc.) is introduced into a host cell alone, co-expressed with rHSA, and significantly increase the expression. For example, the co-expression of PDI with rHSA results in an increase in the expression level of rHSA by 160% compared to the expression level when no expression promoting factor is used.

In some embodiments of the present invention, the rHSA expression promoting factors may be introduced into a host cell in pairs. For example, the combination of PDI and HAC1 resulted in a nearly two-fold increase in the expression level of rHSA compared to the expression level when no expression-promoting factor is used.

In some embodiments of the present invention, three or more rHSA expression promoting factors may be introduced into a host cell. For example, in a particular embodiment of the present invention, rHSA is co-expressed with three expression promoting factors PDI. PPI and HAC1 in a host cell, significantly increasing the expression level of rHSA.

In some embodiments of the present invention, the inventor cloned the ERO1, HAC1, KAR2, PDI, and PPI genes of *Pichia* GS115 strain by genetic engineering techniques, and constructed an inducible expression vector. By co-expression of these proteins with rHSA, a variety of combinations were screened to obtain an engineered fungus of yeast with high expression and high efficiency.

EXAMPLES

1. HSA Cloning and Construction of Expression Vector

The expression vector pPIC9K (purchased from Invitrogen) carries a yeast α-factor signal peptide that can be used to secrete and express foreign proteins. The following primers were designed according to the sequence of NM_000477.5 published by GenBank: (the enzyme cleavage sites are underlined)

```
HSA Forward:
                                        (SEQ ID NO: 1)
CCGCTCGAGAAAAGAGACGCTCACAAGAGTGAGGT HSA Reverse:
                                        (SEQ ID NO: 2)
CCGGAATTCTTATAAGCCTAAGGCAGCTTGACTTGC
```

The human liver cDNA library was used as a template to carry out polymerase chain reaction (PCR) under specific conditions: denaturation at 94° C. for 3 minutes; denaturation at 94° C. for 30 seconds, annealing at 55° C. for 30 seconds, extension at 72° C. for 2 minutes, a total of 30 cycles; then extension at 72° C. for 10 minutes. The obtained PCR product was enzymatically digested with XhoI and EcoRI, and inserted into the pPIC9K vector to obtain the vector pPIC9K-HSA, and the structure is shown in FIG. 13. The HSA DNA sequence was verified by sequencing and the result is shown in FIG. 1. The corresponding amino acid sequence is shown in FIG. 2.

2. Construction and Screening of rHSA Yeast Secretion and Expression Strain

In the present invention, *Pichia* GS115 (purchased from Invitrogen) was used as a host strain, and the pPIC9K-HSA vector was linearized by SalI digestion and electrotransformed into the GS115 strain. Methods for competent preparation and electrotransformation were referred to the literature (James M. Cregg, *Pichia* Protocols, 2$^{nd}$ Edition). The insert was integrated into the HIS4 locus of GS115 chromosome, and the transformed strain was subjected to antibiotic enrichment screening using YPD (Yeast extract Peptone Dextrose) solid medium containing 2 mg/mL geneticin (G418) to obtain yeast strain GS115-rHSA capable of secreting rHSA.

3. Cloning and Vector Construction of *Pichia* ERO1 Gene

The DNA sequence of the *Pichia* ERO1 gene was obtained from the NCBI database, and the following primers were designed for gene amplification: (the enzyme cleavage sites are underlined)

```
ERO Forward:
                                        (SEQ ID NO: 3)
CGGTTCGAAAGCATGAACCCTCAAATCCCTTT ERO Reverse:
                                        (SEQ ID NO: 4)
GCTGGCGGCCGCTTACAAGTCTACTCTATATGTGG
```

Figure 14:
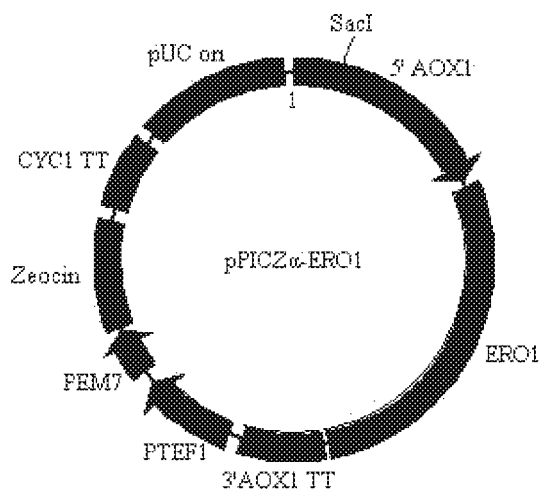
FIG. 14 shows a pPICZα-ERO1 *Pichia* expression vector.

Using the genomics of *Pichia* GS115 strain as a template, the ERO1 gene was obtained by PCR, enzymatically digested with both SnaBI and NotI, and inserted into the expression vector pPICZα (purchased from Invitrogen) to obtain the vector pPICZα-ERO1, and the structure is shown in FIG. 14. The ERO1 DNA sequence was verified by sequencing, as shown in FIG. 3. The corresponding amino acid sequence is shown in FIG. 4.

4. Cloning and Vector Construction of *Pichia* HAC1 Gene

The DNA sequence of the *Pichia* HAC1 gene was obtained from the NCBI database, and the following primers were designed for gene amplification: (the enzyme cleavage sites are underlined)

```
HAC Forward:
                                        (SEQ ID NO: 5)
CGGTTCGAAACGATGCCCGTAGATTCTTCT HAC Reverse:
                                        (SEQ ID NO: 6)
GCTGGCGGCCGCCTATTCCTGGAAGAATACAAAGTC
```

Figure 15:
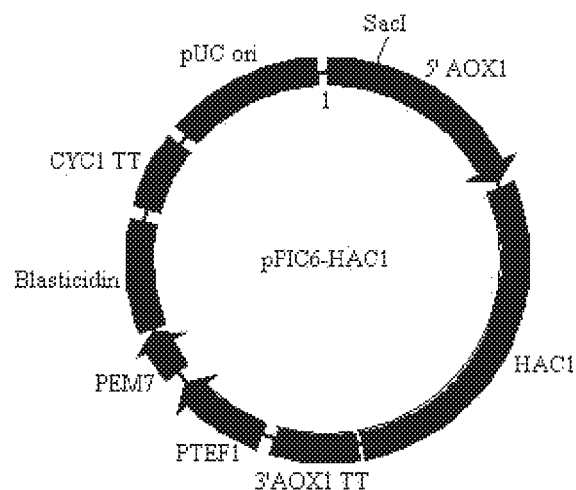
FIG. 15 shows a pPIC6-HAC1 *Pichia* expression vector.

Yeast RNA extraction and reverse transcription methods were referred to the literature (J. Sambrook et al., Molecular Cloning: A Laboratory Manual, 3$^{rd}$ Edition). Using the cDNA of *Pichia* GS115 as a template, the HAC1 gene was obtained by PCR, enzymatically digested with both SnaBI and NotI, and inserted into the expression vector pPIC6 (purchased from Invitrogen) to obtain the vector pPIC6-HAC1, and the structure is shown in FIG. 15. The HAC1 DNA sequence was verified by sequencing and the result is shown in FIG. 5. The corresponding amino acid sequence is shown in FIG. 6.

5. Cloning and Vector Construction of *Pichia* PDI Gene

The DNA sequence of the *Pichia* PDI gene was obtained from the NCBI database, and the following primers were designed for gene amplification: (the enzyme cleavage sites are underlined)

```
PPI Forward:
                                        (SEQ ID NO: 7)
CGGTTCGAAACGATGCAATTAACTGGAATATT PPI Reverse:
                                        (SEQ ID NO: 8)
GCTGGCGGCCGCTTAAAGCTCGTCGTGAGCGTCTGC
```

Figure 16:
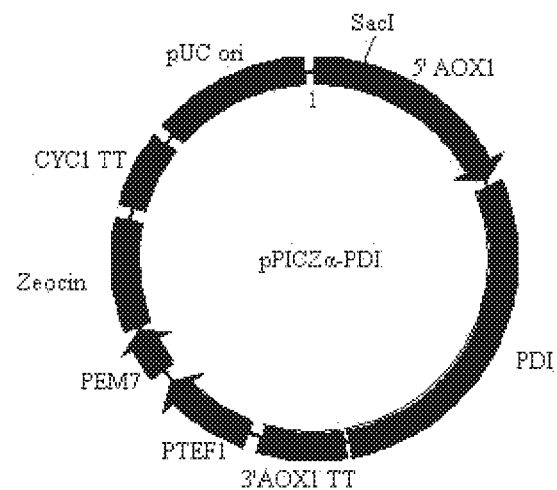
FIG. 16 shows a pPICZα-PD1 *Pichia* expression vector.

Using the genomics of *Pichia* GS115 as a template, the PDI gene was obtained by PCR, enzymatically digested with both SnaBI and NotI, and inserted into the expression vector pPICZα (purchased from Invitrogen) to obtain the vector pPICZα-PDI, and the structure is shown in FIG. 16. The PDI DNA sequence was verified by sequencing and the result is shown in FIG. 7. The corresponding amino acid sequence is shown in FIG. 8.

6. Cloning and Vector Construction of *Pichia* PPI Gene

The DNA sequence of the *Pichia* PPI gene was obtained from the NCBI database, and the following primers were designed for gene amplification: (the enzyme cleavage sites are underlined)

```
PPI Forward:
                                        (SEQ ID NO: 9)
CGGTTCGAAACGATGGAATTAACCGCATTGCGCAGC PPI Reverse:
                                       (SEQ ID NO: 10)
GCTGGCGGCCGCTTACAACTCACCGGAGTTGGTGATC
```

Using the genomics of *Pichia* GS115 strain as a template, the PPI gene was obtained by PCR enzymatically digested with both SnaBI and NotI, and inserted into the expression vector pPIC6 (purchased from Invitrogen) to obtain the vector pPIC6-PPI, and the structure is shown in FIG. 17. The DNA sequence was verified by sequencing, and the sequence is shown in FIG. 9. The corresponding amino acid sequence is shown in FIG. 10.

7. Cloning and Vector Construction of *Pichia* KAR2 Gene

The DNA sequence of the *Pichia* KAR2 gene was obtained from the NCBI database, and the following primers were designed for gene amplification: (the enzyme cleavage sites are underlined)

```
KAR2 Forward:
                                        (SEQ ID NO: 11)
CGGTTCGAAACGATGCTGTCGTTAAAACCATCT KAR2 Reverse:
                                        (SEQ ID NO: 12)
GCTGGCGGCCGCCTATGATCATGATGAGTTGTAG
```

Using the genomics of *Pichia* GS115 strain as a template, the KAR2 gene was obtained by PCR, enzymatically digested with both SnaBI and NotI, and inserted into the expression vector pPIC6 (purchased from Invitrogen) to obtain the vector pPIC6-KAR2, and the structure is shown in FIG. 18. The DNA sequence was verified by sequencing, and the sequence is shown in FIG. 11. The corresponding amino acid sequence is shown in FIG. 12.

8. Construction and Screening of an ERO1 and rHSA Co-Expression Strain

The rHSA secretion and expression strain GS115-rHSA was used as the original strain, and the above constructed pPICZα-ERO1 vector was linearized by SacI digestion and electrotransformed into the GS115-rHSA strain. Methods for competent preparation and electrotransformation were referred to the literature (James M. Cregg, *Pichia* Protocols, $2^{nd}$ Edition). The insert was integrated into the chromosome 5' AOX site of the GS115-rHSA strain. The transformed strain was subjected to antibiotic enrichment screening using YPD solid medium containing 2 mg/mL zeocin to obtain the ERO1 and rHSA co-expression yeast strain GS115-rHSA-ERO1.

9. Construction and Screening of an HAC1 and rHSA Co-Expression Strain

The rHSA secretion and expression strain GS115-rHSA was used as the original strain, and the pPIC6-HAC1 vector constructed in Example 4 was linearized by SacI digestion and electrotransformed into the GS115-rHSA strain. Methods for competent preparation and electrotransformation were referred to the literature (James M. Cregg, *Pichia* Protocols, $2^{nd}$ Edition). The insert was integrated into the chromosome 5' AOX site of the GS115-rHSA strain. The transformed strain was subjected to antibiotic enrichment screening using YPD solid medium containing 1 mg/mL blasticidin to obtain the HAC1 and rHSA co-expression yeast strain GS115-rHSA-HAC1.

10. Construction and Screening of a PDI and rHSA Co-Expression Strain

The rHSA secretion and expression strain GS115-rHSA was used as the original strain, and the above constructed pPICZα-PDI vector was linearized by SacI digestion and electrotransformed into the GS115-rHSA strain. Methods for competent preparation and electrotransformation were referred to the literature (James M. Cregg, *Pichia* Protocols, $2^{nd}$ Edition). The insert was integrated into the chromosome 5' AOX site of the GS115-rHSA strain. The transformed strain was subjected to antibiotic enrichment screening using YPD solid medium containing 2 mg/mL zeocin to obtain the PDI and rHSA co-expression yeast strain GS115-rHSA-PDI.

11. Construction and Screening of a PPI and rHSA Co-Expression Strain

The rHSA secretion and expression strain GS115-rHSA was used as the original strain, and the pPIC6-PPI vector constructed in Example 6 was linearized by PmeI digestion and electrotransformed into the GS115-rHSA strain. Methods for competent preparation and electrotransformation were referred to the literature (James M. Cregg, *Pichia* Protocols, $2^{nd}$ Edition). The insert was integrated into the chromosome 5' AOX site of the GS115-rHSA strain. The transformed strain was subjected to antibiotic enrichment screening using YPD solid medium containing 1 mg/mL blasticidin to obtain the PPI and rHSA co-expression yeast strain GS115-rHSA-PPI.

12. Construction and Screening of a KAR2 and rHSA Co-Expression Strain

The rHSA secretion and expression strain GS115-rHSA was used as the original strain, and the pPIC6-KAR2 vector constructed in Example 7 was linearized by PmeI digestion and electrotransformed into the GS115-rHSA strain. Methods for competent preparation and electrotransformation were referred to the literature (James M. Cregg, *Pichia* Protocols, $2^{nd}$ Edition). The insert was integrated into the chromosome 5' AOX site of the GS115-rHSA strain. The transformed strain was subjected to antibiotic enrichment screening using YPD solid medium containing 1 mg/mL blasticidin to obtain the KAR2 and rHSA co-expression yeast strain GS115-rHSA-KAR2.

13. Construction and Screening of an HAC1, PDI and rHSA Co-Expression Strain

The expression strain GS115-rHSA-PDI was used as the original strain, and the above constructed pPIC6-HAC1 vector was linearized by SacI digestion and electrotransformed into the GS115-rHSA-PDI strain. Methods for competent preparation and electrotransformation were referred to the literature (James M. Cregg, *Pichia* Protocols, $2^{nd}$ Edition). The insert was integrated into the chromosome 5' AOX site of the GS115-rHSA-PDI strain. The transformed strain was subjected to antibiotic enrichment screening using YPD solid medium containing 1 mg/mL blasticidin to obtain the HAC1, PDI and rHSA co-expression yeast strain GS115-rHSA-PDI-HAC1.

14. Construction and Screening of a PPI, PDI and rHSA Co-Expression Strain

The expression strain GS115-rHSA-PDI screened in Example 10 was used as the original strain, and the pPIC6-PPI vector constructed in Example 6 was linearized by PmeI digestion and electrotransformed into the GS115-rHSA-PDI strain. Methods for competent preparation and electrotransformation were referred to the literature (James M. Cregg, *Pichia* Protocols, $2^{nd}$ Edition). The insert was integrated into the chromosome 5' AOX site of the GS115-rHSA-PDI strain. The transformed strain was subjected to antibiotic enrichment screening using YPD solid medium containing 1 mg/mL blasticidin to obtain the PPI, PDI and rHSA co-expression yeast strain GS115-rHSA-PDI-PPI.

15. Induced Expression of rHSA Co-Expression Strain in Shake Flask

The single colonies of GS115-rHSA-ERO1, GS115-rHSA-HAC1, GS115-rHSA-PDI, GS115-rHSA-PPI, GS115-rHSA-KAR2, GS115-rHSA-PDI-HAC1 and GS115-rHSA-PDI-PPI strains screened in the above examples were separately picked, inoculated into 2 ml of MGY medium (1.34% yeast nitrogen source base; 1.0% glycerol; $4.0 \times 10^{-5}$ biotin), and cultured at 30° C. for 16 hours. After centrifugation, the thalluses were collected and transferred to 20 ml of BMMY medium (1.0% yeast extract: 2.0% peptone; 0.1 M potassium phosphate buffer, pH 6.0; 1.34% yeast nitrogen source base; 0.5% anhydrous methanol) for culture, and induced to express for 72 hours, wherein 50 µl of anhydrous methanol was added every 12 hours. After the end of the induction, the culture supernatant was taken for SDS-PAGE electrophoresis (FIG. 19). Compared with the control strain (GS115-rHSA), the expression levels of rHSA were improved in all of the seven co-expression strains. The analysis was performed using Quantity One software, and the expression ratios are shown in Table 1.

TABLE 1

| Strain | Expression ratio |
|---|---|
| GS115-rHSA | 100% |
| GS115-rHSA-PDI | 260% |
| GS115-rHSA-HAC1 | 210% |
| GS115-rHSA-KAR2 | 168% |
| GS115-rHSA-PPI | 162% |
| GS115-rHSA-ERO1 | 150% |
| GS115-rHSA-PDI-HAC1 | 280% |
| GS115-rHSA-PDI-PPI | 220% |

16. Fermentation of rHSA Co-Expression Strains

GS115-rHSA strain and GS115-rHSA-ERO1, GS115-rHSA-HAC1, GS115-rHSA-PDI. GS115-rHSA-PPI, GS115-rHSA-KAR2, GS115-rHSA-PDI-HAC1 and GS115-rHSA-PDI-PPI strains screened in Example 15 were fermented using 5-liter fermentors, and the fermentation conditions were referred to "*Pichia* Fermentation Process Guidelines" published by Invitrogen. The fermentation was terminated after 80 hours of the induced expression, and the culture supernatant was taken to analyze the expression level of rHSA. The results are shown in Table 2. When the fixed fermentation time was 80 hours, the expression level of rHSA in the co-expression strain was significantly increased, up to 18.2 g/L of fermentation supernatant, which laid a foundation for large-scale industrial production of rHSA.

TABLE 2

| Strain | Maximum expression (g/L) |
|---|---|
| GS115-rHSA | 5.98 |
| GS115-rHSA-PDI | 16.9 |
| GS115-rHSA-HAC1 | 12.6 |
| GS115-rHSA-KAR2 | 10.0 |
| GS115-rHSA-PPI | 9.7 |
| GS115-rHSA-ERO1 | 8.9 |
| GS115-rHSA-PDI-HAC1 | 18.2 |
| GS115-rHSA-PDI-PPI | 13.1 |

The invention claimed is:

1. A method for highly expressing recombinant human serum albumin (rHSA) in a yeast host cell, comprising co-expressing a human serum albumin gene, a gene encoding protein disulfide isomerase (PDI), and a gene encoding transcriptional activator HAC1, wherein the yeast host cell is *Pichia pastoris*.

2. The method according to claim 1, wherein the gene encoding PDI and the gene encoding transcriptional activator HAC1 are introduced into the yeast host cell.

3. The method according to claim 1, wherein the human serum albumin gene is transformed into the yeast host cell by a plasmid.

4. The method according to claim 1, wherein the gene encoding PDI and the gene encoding transcriptional activator HAC1 are transformed into the yeast host cell by one or more plasmids.

5. An engineered yeast that highly expresses recombinant human serum albumin (rHSA) and comprises: a human serum albumin gene, a gene encoding PDI, and a gene encoding transcriptional activator HAC1, wherein the yeast is *Pichia pastoris*, and wherein the gene encoding PDI and the gene encoding transcriptional activator HAC1 are introduced into the engineered yeast.

6. The engineered yeast according to claim 5, wherein the human serum albumin gene is transformed into the engineered yeast by a plasmid.

7. The engineered yeast according to claim 5, wherein the gene encoding PDI and the gene encoding transcriptional activator HAC1 are transformed into the engineered yeast by one or more plasmids.

8. The method according to claim 1, wherein the gene encoding PDI is transformed into the yeast host cell by a pPICZα vector, and the gene encoding transcriptional activator HAC1 is transformed into the yeast host cell by a pPIC6 vector.

9. The engineered yeast according to claim 5, wherein the gene encoding protein PDI is transformed into the yeast host cell by a pPICZα vector, and the gene encoding transcriptional activator HAC1 is transformed into the yeast host cell by a pPIC6 vector.

10. The engineered yeast according to claim 5, wherein the gene encoding PDI and the gene encoding transcriptional activator HAC1 are integrated into a chromosome of the yeast host cell.

11. A method for highly expressing recombinant human serum albumin (rHSA) in *Pichia pastoris*, comprising co-expressing a gene encoding rHSA, a gene encoding protein disulfide isomerase (PDI), and a gene encoding transcriptional activator HAC1,
    wherein co-expressing rHSA, PDI, and HAC1, increases expression of rHSA relative to co-expressing rHSA and PDI alone.

12. The method of claim 1, wherein highly expressing rHSA comprises expressing up to 18.2 grams of rHSA per liter of culture.

* * * * *

SEQUENCE LISTING

```
<160> NUMBER OF SEQ ID NOS: 24

<210> SEQ ID NO 1
<211> LENGTH: 35
<212> TYPE: DNA
<213> ORGANISM: artificial sequence
<220> FEATURE:
<223> OTHER INFORMATION: primer sequence

<400> SEQUENCE: 1
ccgctcgaga aaagagacgc tcacaagagt gaggt                              35

<210> SEQ ID NO 2
<211> LENGTH: 36
<212> TYPE: DNA
<213> ORGANISM: Artificial Sequence
<220> FEATURE:
<223> OTHER INFORMATION: primer sequence

<400> SEQUENCE: 2
ccggaattct tataagccta aggcagcttg acttgc                             36

<210> SEQ ID NO 3
<211> LENGTH: 32
<212> TYPE: DNA
<213> ORGANISM: Artificial Sequence
<220> FEATURE:
<223> OTHER INFORMATION: primer sequence

<400> SEQUENCE: 3
cggttcgaaa gcatgaaccc tcaaatccct tt                                 32

<210> SEQ ID NO 4
<211> LENGTH: 35
<212> TYPE: DNA
<213> ORGANISM: Artificial Sequence
<220> FEATURE:
<223> OTHER INFORMATION: primer sequence

<400> SEQUENCE: 4
gctggcggcc gcttacaagt ctactctata tgtgg                              35
```

-continued

```
<210> SEQ ID NO 5
<211> LENGTH: 30
<212> TYPE: DNA
<213> ORGANISM: Artificial Sequence
<220> FEATURE:
<223> OTHER INFORMATION: primer sequence

<400> SEQUENCE: 5
cggttcgaaa cgatgcccgt agattcttct                                       30

<210> SEQ ID NO 6
<211> LENGTH: 36
<212> TYPE: DNA
<213> ORGANISM: Artificial Sequence
<220> FEATURE:
<223> OTHER INFORMATION: primer sequence

<400> SEQUENCE: 6
gctggcggcc gcctattcct ggaagaatac aaagtc                                36

<210> SEQ ID NO 7
<211> LENGTH: 33
<212> TYPE: DNA
<213> ORGANISM: Artificial Sequence
<220> FEATURE:
<223> OTHER INFORMATION: primer sequence

<400> SEQUENCE: 7
cggttcgaaa cgatgcaatt caactggaat att                                   33

<210> SEQ ID NO 8
<211> LENGTH: 36
<212> TYPE: DNA
<213> ORGANISM: Artificial Sequence
<220> FEATURE:
<223> OTHER INFORMATION: primer sequence

<400> SEQUENCE: 8
gctggcggcc gcttaaagct cgtcgtgagc gtctgc                                36

<210> SEQ ID NO 9
<211> LENGTH: 36
<212> TYPE: DNA
<213> ORGANISM: Artificial Sequence
<220> FEATURE:
<223> OTHER INFORMATION: primer sequence

<400> SEQUENCE: 9
cggttcgaaa cgatggaatt aaccgcattg cgcagc                                36

<210> SEQ ID NO 10
<211> LENGTH: 37
<212> TYPE: DNA
<213> ORGANISM: Artificial Sequence
<220> FEATURE:
<223> OTHER INFORMATION: primer sequence

<400> SEQUENCE: 10
gctggcggcc gcttacaact caccggagtt ggtgatc                               37

<210> SEQ ID NO 11
<211> LENGTH: 33
<212> TYPE: DNA
<213> ORGANISM: Artificial Sequence
<220> FEATURE:
<223> OTHER INFORMATION: primer sequence
```

-continued

<400> SEQUENCE: 11
cggttcgaaa cgatgctgtc gttaaaacca tct                          33

<210> SEQ ID NO 12
<211> LENGTH: 34
<212> TYPE: DNA
<213> ORGANISM: Artificial Sequence
<220> FEATURE:
<223> OTHER INFORMATION: primer sequence

<400> SEQUENCE: 12
gctggcggcc gcctatgatc atgatgagtt gtag                         34

<210> SEQ ID NO 13
<211> LENGTH: 1758
<212> TYPE: DNA
<213> ORGANISM: Homo sapiens

<400> SEQUENCE: 13
gatgcacaca agagtgaggt tgctcatcgg tttaaagatt tgggagaaga aaatttcaaa    60
gccttggtgt tgattgcctt tgctcagtat cttcagcagt gtccatttga agatcatgta   120
aaattagtga atgaagtaac tgaatttgca aaaacatgtg ttgctgatga gtcagctgaa   180
aattgtgaca aatcacttca tacccttttt ggagacaaat tatgcacagt tgcaactctt   240
cgtgaaacct atggtgaaat ggctgactgc tgtgcaaaac aagaacctga gaaaatgaa    300 tgcttcttgc aacacaaaga tgacaaccca aacctccccc gattggtgag accagaggtt   360
gatgtgatgt gcactgcttt tcatgacaat gaagagacat ttttgaaaaa atacttatat   420
gaaattgcca gaagacatcc ttactttat gccccggaac tccttttctt tgctaaaagg   480
tataaagctg cttttacaga atgttgccaa gctgctgata agctgcctg cctgttgcca   540 aagctcgatg aacttcggga tgaagggaag gcttcgtctg ccaaacagag actcaagtgt   600
gccagtctcc aaaaatttgg agaaagagct ttcaaagcat gggcagtagc tcgcctgagc   660
cagagatttc ccaaagctga gtttgcagaa gtttccaagt tagtgacaga tcttaccaaa   720
gtccacacgg aatgctgcca tggagatctg cttgaatgtg ctgatgacag gcggaccttt   780
gccaagtata tctgtgaaaa tcaagattcg atctccagta aactgaagga atgctgtgaa   840
aaacctctgt tggaaaaatc ccactgcatt gccgaagtgg aaaatgatga atgcctgct    900 gacttgcctt cattagctgc tgattttgtt gaaagtaagg atgtttgcaa aaactatgct   960
gaggcaaagg atgtcttcct gggcatgttt ttgtatgaat atgcaagaag gcatcctgat  1020
tactctgtcg tgctgctgct gagacttgcc aagacatatg aaaccactct agagaagtgc  1080
tgtgccgctg cagatcctca tgaatgctat gccaaagtgt tcgatgaatt taaacctctt  1140
gtggaagagc ctcagaattt aatcaaacaa aattgtgagc ttttgagca gcttggagag  1200 tacaaattcc agaatgcgct attagttcgt tacaccaaga aagtacccca agtgtcaact  1260
ccaactcttg tagaggtctc aagaaaccta ggaaaagtgg gcagcaaatg ttgtaaacat  1320
cctgaagcaa aagaatgcc ctgtgcagaa gactatctat ccgtggtcct gaaccagtta  1380
tgtgtgttgc atgagaaaac gccagtaagt gacagagtca ccaaatgctg cacagaatcc  1440
ttggtgaaca ggcgaccatg cttttcagct ctggaagtcg atgaaacata cgttcccaaa  1500
gagtttaatg ctgaaacatt caccttccat gcagatatat gcacactttc tgagaaggag  1560
agacaaatca gaaacaaac tgcacttgtt gagctcgtga acacaagcc caaggcaaca  1620 aaagagcaac tgaaagctgt tatggatgat ttcgcagctt ttgtagagaa gtgctgcaag  1680

```
gctgacgata aggagacctg ctttgccgag gagggtaaaa aacttgttgc tgcaagtcaa    1740
gctgccttag gcttataa                                                  1758
```

<210> SEQ ID NO 14
<211> LENGTH: 585
<212> TYPE: PRT
<213> ORGANISM: Homo sapiens

<400> SEQUENCE: 14

```
Asp Ala His Lys Ser Glu Val Ala His Arg Phe Lys Asp Leu Gly Glu
1               5                   10                  15

Glu Asn Phe Lys Ala Leu Val Leu Ile Ala Phe Ala Gln Tyr Leu Gln
            20                  25                  30

Gln Cys Pro Phe Glu Asp His Val Lys Leu Val Asn Glu Val Thr Glu
        35                  40                  45

Phe Ala Lys Thr Cys Val Ala Asp Glu Ser Ala Glu Asn Cys Asp Lys
    50                  55                  60

Ser Leu His Thr Leu Phe Gly Asp Lys Leu Cys Thr Val Ala Thr Leu
65                  70                  75                  80

Arg Glu Thr Tyr Gly Glu Met Ala Asp Cys Cys Ala Lys Gln Glu Pro
                85                  90                  95

Glu Arg Asn Glu Cys Phe Leu Gln His Lys Asp Asp Asn Pro Asn Leu
            100                 105                 110

Pro Arg Leu Val Arg Pro Glu Val Asp Val Met Cys Thr Ala Phe His
        115                 120                 125

Asp Asn Glu Glu Thr Phe Leu Lys Lys Tyr Leu Tyr Glu Ile Ala Arg
    130                 135                 140

Arg His Pro Tyr Phe Tyr Ala Pro Glu Leu Leu Phe Phe Ala Lys Arg
145                 150                 155                 160

Tyr Lys Ala Ala Phe Thr Glu Cys Cys Gln Ala Ala Asp Lys Ala Ala
                165                 170                 175

Cys Leu Leu Pro Lys Leu Asp Glu Leu Arg Asp Glu Gly Lys Ala Ser
            180                 185                 190

Ser Ala Lys Gln Arg Leu Lys Cys Ala Ser Leu Gln Lys Phe Gly Glu
        195                 200                 205

Arg Ala Phe Lys Ala Trp Ala Val Ala Arg Leu Ser Gln Arg Phe Pro
    210                 215                 220

Lys Ala Glu Phe Ala Glu Val Ser Lys Leu Val Thr Asp Leu Thr Lys
225                 230                 235                 240

Val His Thr Glu Cys Cys His Gly Asp Leu Leu Glu Cys Ala Asp Asp
                245                 250                 255

Arg Ala Asp Leu Ala Lys Tyr Ile Cys Glu Asn Gln Asp Ser Ile Ser
            260                 265                 270

Ser Lys Leu Lys Glu Cys Cys Glu Lys Pro Leu Leu Glu Lys Ser His
        275                 280                 285

Cys Ile Ala Glu Val Glu Asn Asp Glu Met Pro Ala Asp Leu Pro Ser
    290                 295                 300

Leu Ala Ala Asp Phe Val Glu Ser Lys Asp Val Cys Lys Asn Tyr Ala
305                 310                 315                 320

Glu Ala Lys Asp Val Phe Leu Gly Met Phe Leu Tyr Glu Tyr Ala Arg
                325                 330                 335

Arg His Pro Asp Tyr Ser Val Val Leu Leu Leu Arg Leu Ala Lys Thr
            340                 345                 350
```

Tyr Glu Thr Thr Leu Glu Lys Cys Cys Ala Ala Ala Asp Pro His Glu
            355                 360                 365

Cys Tyr Ala Lys Val Phe Asp Glu Phe Lys Pro Leu Val Glu Glu Pro
        370                 375                 380

Gln Asn Leu Ile Lys Gln Asn Cys Glu Leu Phe Glu Gln Leu Gly Glu
385                 390                 395                 400

Tyr Lys Phe Gln Asn Ala Leu Leu Val Arg Tyr Thr Lys Lys Val Pro
                405                 410                 415

Gln Val Ser Thr Pro Thr Leu Val Glu Val Ser Arg Asn Leu Gly Lys
            420                 425                 430

Val Gly Ser Lys Cys Cys Lys His Pro Glu Ala Lys Arg Met Pro Cys
        435                 440                 445

Ala Glu Asp Tyr Leu Ser Val Val Leu Asn Gln Leu Cys Val Leu His
        450                 455                 460

Glu Lys Thr Pro Val Ser Asp Arg Val Thr Lys Cys Cys Thr Glu Ser
465                 470                 475                 480

Leu Val Asn Arg Arg Pro Cys Phe Ser Ala Leu Glu Val Asp Glu Thr
                485                 490                 495

Tyr Val Pro Lys Glu Phe Asn Ala Glu Thr Phe Thr Phe His Ala Asp
            500                 505                 510

Ile Cys Thr Leu Ser Glu Lys Glu Arg Gln Ile Lys Lys Gln Thr Ala
        515                 520                 525

Leu Val Glu Leu Val Lys His Lys Pro Lys Ala Thr Lys Glu Gln Leu
        530                 535                 540

Lys Ala Val Met Asp Asp Phe Ala Ala Phe Val Glu Lys Cys Cys Lys
545                 550                 555                 560

Ala Asp Asp Lys Glu Thr Cys Phe Ala Glu Glu Gly Lys Lys Leu Val
                565                 570                 575

Ala Ala Ser Gln Ala Ala Leu Gly Leu
            580                 585

<210> SEQ ID NO 15
<211> LENGTH: 1584
<212> TYPE: DNA
<213> ORGANISM: Pichia

<400> SEQUENCE: 15
atgaggatag taaggagcgt agctatcgca atagcctgtc attgtataac agcgttagca      60
aaccctcaaa tcccttttga cggcaactac accgagatca tcgtgccaga taccgaagtt     120
aacatcggac agattgtaga tattaaccac gaaataaaac ccaaactggt ggaactggtc     180
aacacagact tcttcaaata ttacaaatta aacctatgga accatgtcc gttttggaat      240 ggtgatgagg gattctgcaa gtataaggat tgctctgtcg actttatcac tgattggtct     300
caggtgcctg atatctggca accagaccaa ttgggtaagc ttggagataa cacggtacat     360
aaggataagg ccaagatgaa aatgagctg tcctcaaatg attattgcgc tttggataaa     420
gacgacgatg aagatttagt atatgtcaat tgattgata accctgaaag attcaccggt      480
tatggtggtc agcaatctga atctatttgg actgcggtct atgatgagaa ctgtttccag     540
ccgaatgaag gatcacaatt gggtcaagtt gaagacctct gtttggagaa acagatcttt     600
taccgattgg tttctggttt gcattctagt atctccaccc acctcacaaa cgaatatctg     660
aatttgaaaa atggagcata cgaaccaaat tgaaacagt tcatgatcaa agttgggtat     720
tttactgaaa gaattcaaaa cttacatctc aattatgtcc ttgtattgaa gtcactaata     780

| | |
|---|---|
| aagctacaag aatacaatgt tatcgacaat ctacctctcg atgactcttt gaaagctggt | 840 |
| cttagcggtt taatatctca aggagcacag ggtattaacc agagctctga tgattatcta | 900 |
| tttaacgaga aggttctttt ccaaaatgac caaaatgatg atttgaaaaa tgaattccgt | 960 |
| gacaaattcc gcaacgtgac tagattaatg gattgtgtcc attgcgagag atgcaaatta | 1020 |
| tggggaaaat tgcaaactac agggtacggg actgcattga agattctatt tgatttgaag | 1080 |
| aatcctaatg actccatcaa tttaaagaga gttgagttag ttgctctagt caacacattc | 1140 |
| catagattgt ccaaatctgt tgaaagcatt gaaaactttg aaaaactata aagattcaa | 1200 |
| ccgccaacgc aggatcgtgc atcagcgtcg tccgaatcct taggccttt cgataacgaa | 1260 |
| gatgaacaaa atctcctcaa ctcgttttcg gttgatcagg cagtcatttc atcgaaagag | 1320 |
| gcaccagaag aaatcaaaag caaacctgtt ggaaaagccg catataaaca aaacagttgt | 1380 |
| ccatcattgg gttcaaaatc tatcaaagaa gcattccatg aagaacttca cgcatttatt | 1440 |
| gatgcaattg gatttatatt gaactcttac aggactttgc ccaagctgtt gtacacactt | 1500 |
| ttcctcgtta aatcatctga attatgggac attttcattg gcactcaaag gcaccgagat | 1560 |
| accacatata gagtagactt gtaa | 1584 |

<210> SEQ ID NO 16
<211> LENGTH: 527
<212> TYPE: PRT
<213> ORGANISM: Pichia

<400> SEQUENCE: 16

Met Arg Ile Val Arg Ser Val Ala Ile Ala Cys His Cys Ile
1               5                   10                  15

Thr Ala Leu Ala Asn Pro Gln Ile Pro Phe Asp Gly Asn Tyr Thr Glu
                20                  25                  30

Ile Ile Val Pro Asp Thr Glu Val Asn Ile Gly Gln Ile Val Asp Ile
            35                  40                  45

Asn His Glu Ile Lys Pro Lys Leu Val Glu Leu Val Asn Thr Asp Phe
        50                  55                  60

Phe Lys Tyr Tyr Lys Leu Asn Leu Trp Lys Pro Cys Pro Phe Trp Asn
65                  70                  75                  80

Gly Asp Glu Gly Phe Cys Lys Tyr Lys Asp Cys Ser Val Asp Phe Ile
                85                  90                  95

Thr Asp Trp Ser Gln Val Pro Asp Ile Trp Gln Pro Asp Gln Leu Gly
            100                 105                 110

Lys Leu Gly Asp Asn Thr Val His Lys Asp Lys Gly Gln Asp Glu Asn
        115                 120                 125

Glu Leu Ser Ser Asn Asp Tyr Cys Ala Leu Asp Lys Asp Asp Glu
    130                 135                 140

Asp Leu Val Tyr Val Asn Leu Ile Asp Asn Pro Glu Arg Phe Thr Gly
145                 150                 155                 160

Tyr Gly Gly Gln Gln Ser Glu Ser Ile Trp Thr Ala Val Tyr Asp Glu
                165                 170                 175

Asn Cys Phe Gln Pro Asn Glu Gly Ser Gln Leu Gly Gln Val Glu Asp
            180                 185                 190

Leu Cys Leu Glu Lys Gln Ile Phe Tyr Arg Leu Val Ser Gly Leu His
        195                 200                 205

Ser Ser Ile Ser Thr His Leu Thr Asn Glu Tyr Leu Asn Leu Lys Asn
    210                 215                 220

Gly Ala Tyr Glu Pro Asn Leu Lys Gln Phe Met Ile Lys Val Gly Tyr

```
              225                 230                 235                 240
          Phe Thr Glu Arg Ile Gln Asn Leu His Leu Asn Tyr Val Leu Val Leu
                          245                 250                 255

Lys Ser Leu Ile Lys Leu Gln Glu Tyr Asn Val Ile Asp Asn Leu Pro
                          260                 265                 270

Leu Asp Asp Ser Leu Lys Ala Gly Leu Ser Gly Leu Ile Ser Gln Gly
                          275                 280                 285

Ala Gln Gly Ile Asn Gln Ser Ser Asp Asp Tyr Leu Phe Asn Glu Lys
                          290                 295                 300

Val Leu Phe Gln Asn Asp Gln Asn Asp Leu Lys Asn Glu Phe Arg
          305                 310                 315                 320

Asp Lys Phe Arg Asn Val Thr Arg Leu Met Asp Cys Val His Cys Glu
                          325                 330                 335

Arg Cys Lys Leu Trp Gly Lys Leu Gln Thr Thr Gly Tyr Gly Thr Ala
                          340                 345                 350

Leu Lys Ile Leu Phe Asp Leu Lys Asn Pro Asn Asp Ser Ile Asn Leu
                          355                 360                 365

Lys Arg Val Glu Leu Val Ala Leu Val Asn Thr Phe His Arg Leu Ser
          370                 375                 380

Lys Ser Val Glu Ser Ile Glu Asn Phe Glu Lys Leu Tyr Lys Ile Gln
          385                 390                 395                 400

Pro Pro Thr Gln Asp Arg Ala Ser Ala Ser Glu Ser Leu Gly Leu
                          405                 410                 415

Phe Asp Asn Glu Asp Glu Gln Asn Leu Leu Asn Ser Phe Ser Val Asp
                          420                 425                 430

Gln Ala Val Ile Ser Ser Lys Glu Ala Pro Glu Glu Ile Lys Ser Lys
                          435                 440                 445

Pro Val Gly Lys Ala Ala Tyr Lys Gln Asn Ser Cys Pro Ser Leu Gly
                          450                 455                 460

Ser Lys Ser Ile Lys Glu Ala Phe His Glu Glu Leu His Ala Phe Ile
          465                 470                 475                 480

Asp Ala Ile Gly Phe Ile Leu Asn Ser Tyr Arg Thr Leu Pro Lys Leu
                          485                 490                 495

Leu Tyr Thr Leu Phe Leu Val Lys Ser Ser Glu Leu Trp Asp Ile Phe
                          500                 505                 510

Ile Gly Thr Gln Arg His Arg Asp Thr Thr Tyr Arg Val Asp Leu
                          515                 520                 525

<210> SEQ ID NO 17
<211> LENGTH: 915
<212> TYPE: DNA
<213> ORGANISM: Pichia

<400> SEQUENCE: 17
atgcccgtag attcttctca taagacagct agcccacttc cacctcgtaa aagagcaaag    60
acggaagaag aaaaggagca gcgtcgagtg gaacgtatcc tacgtaatag agagcggcc   120 catgcttcca gagagaagaa acgaagacac gttgaatttc tggaaaacca cgtcgtcgac   180
ctggaatctg cacttcaaga atcagccaaa gccactaaca agttgaaaga aatacaagat   240
atcattgttt caaggttgga agccttaggt ggtaccgtct cagatttgga tttaacagtt   300
ccggaagtcg attttcccaa atcttctgat ttggaaccca tgtctgatct ctcaacttct   360
tcgaaatcgg agaagcatc tacatccact cgcagatctt tgactgagga tctggacgaa   420
gatgacgtcg ctgaatatga cgacgaagaa gaggacgaag agttacccag gaaaatgaaa   480
```

```
gtcttaaacg acaaaaacaa gagcacatct atcaagcagg agaagttgaa tgaacttcca    540
tctcctttgt catccgattt ttcagacgta gatgaagaaa agtcaactct cacacattta    600
aagttgcaac agcaacaaca acaaccagta gacaattatg tttctactcc tttgagtctt    660
ccggaggatt cagttgattt tattaaccca ggtaacttaa aaatagagtc cgatgagaac    720
ttcttgttga gttcaaatac tttacaaata aaacacgaaa atgacaccga ctacattact    780
acagctccat caggttccat caatgatttt tttaattctt atgacattag cgagtcgaat    840
cggttgcatc atccagcagc accatttacc gctaatgcat ttgatttaaa tgactttgta    900
ttcttccagg aataa                                                    915
```

<210> SEQ ID NO 18
<211> LENGTH: 304
<212> TYPE: PRT
<213> ORGANISM: Pichia

<400> SEQUENCE: 18

```
Met Pro Val Asp Ser Ser His Lys Thr Ala Ser Pro Leu Pro Pro Arg
1               5                   10                  15

Lys Arg Ala Lys Thr Glu Glu Lys Glu Gln Arg Arg Val Glu Arg
            20                  25                  30

Ile Leu Arg Asn Arg Arg Ala Ala His Ala Ser Arg Glu Lys Lys Arg
        35                  40                  45

Arg His Val Glu Phe Leu Glu His His Val Val Asp Leu Glu Ser Ala
    50                  55                  60

Leu Gln Glu Ser Ala Lys Ala Thr Asn Lys Leu Lys Glu Ile Gln Asp
65                  70                  75                  80

Ile Ile Val Ser Arg Leu Glu Ala Leu Gly Gly Thr Val Ser Asp Leu
                85                  90                  95

Asp Leu Thr Val Pro Glu Val Asp Phe Pro Lys Ser Ser Asp Leu Glu
            100                 105                 110

Pro Met Ser Asp Leu Ser Thr Ser Ser Lys Ser Glu Lys Ala Ser Thr
        115                 120                 125

Ser Thr Arg Arg Ser Leu Thr Glu Asp Leu Asp Glu Asp Val Ala
    130                 135                 140

Glu Tyr Asp Asp Glu Glu Glu Asp Glu Glu Leu Pro Arg Lys Met Lys
145                 150                 155                 160

Val Leu Asn Asp Lys Asn Lys Ser Thr Ser Ile Lys Gln Glu Lys Leu
                165                 170                 175

Asn Glu Leu Pro Ser Pro Leu Ser Ser Asp Phe Ser Asp Val Asp Glu
            180                 185                 190

Glu Lys Ser Thr Leu Thr His Leu Lys Leu Gln Gln Gln Gln Gln
        195                 200                 205

Pro Val Asp Asn Tyr Val Ser Thr Pro Leu Ser Leu Pro Glu Asp Ser
    210                 215                 220

Val Asp Phe Ile Asn Pro Gly Asn Leu Lys Ile Glu Ser Asp Glu Asn
225                 230                 235                 240

Phe Leu Leu Ser Ser Asn Thr Leu Gln Ile Lys His Glu Asn Asp Thr
                245                 250                 255

Asp Tyr Ile Thr Thr Ala Pro Ser Gly Ser Ile Asn Asp Phe Phe Asn
            260                 265                 270

Ser Tyr Asp Ile Ser Glu Ser Asn Arg Leu His His Pro Ala Ala Pro
        275                 280                 285
```

Phe Thr Ala Asn Ala Phe Asp Leu Asn Asp Phe Val Phe Phe Gln Glu
        290                 295                 300

<210> SEQ ID NO 19
<211> LENGTH: 1554
<212> TYPE: DNA
<213> ORGANISM: Pichia

<400> SEQUENCE: 19

| | |
|---|---:|
| atgcaattca actggaatat taaaactgtg gcaagtattt tgtccgctct cacactagca | 60 |
| caagcaagtg atcaggaggc tattgctcca gaggactctc atgtcgtcaa attgactgaa | 120 |
| gccactttg agtctttcat caccagtaat cctcacgttt ggcagagtt ttttgccct | 180 |
| tggtgtggtc actgtaagaa gttgggccct gaacttgttt ctgctgccga gatcttaaag | 240 |
| gacaatgagc aggttaagat tgctcaaatt gattgtacgg aggagaagga attatgtcaa | 300 |
| ggctacgaaa ttaagggta tcctactttg aaggtgttcc atggtgaggt tgaggtccca | 360 |
| agtgactatc aaggtcaaag acagagccaa agcattgtca gctatatgct aaagcagagt | 420 |
| ttaccccctg tcagtgaaat caatgcaacc aaagatttag acgacacaat cgccgaggca | 480 |
| aaagagcccg tgattgtgca agtactaccg gaagatgcat ccaacttgga atctaacacc | 540 |
| acattttacg gagttgccgg tactctcaga gagaaattca cttttgtctc cactaagtct | 600 |
| actgattatg ccaaaaaata cactagcgac tcgactcctg cctatttgct tgtcagacct | 660 |
| ggcgaggaac tagtgttta ctctggtgag gagttagatg agactcattt ggtgcactgg | 720 |
| attgatattg agtccaaacc tctatttgga gacattgacg gatccacctt caaatcatat | 780 |
| gctgaagcta acatcccttt agcctactat ttctatgaga acgaagaaca acgtgctgct | 840 |
| gctgccgata ttattaaacc ttttgctaaa gagcaacgtg gcaaaattaa ctttgttggc | 900 |
| ttagatgccg ttaaattcgg taagcatgcc aagaacttaa acatggatga agagaaactc | 960 |
| cctctatttg tcattcatga tttggtgagc aacaagaagt tggagttcc tcaagaccaa | 1020 |
| gaattgacga acaaagatgt gaccgagctg attgagaaat tcatcgcagg agaggcagaa | 1080 |
| ccaattgtga atcagagcc aattccagaa attcaagaag agaaagtctt caagctagtc | 1140 |
| ggaaaggccc acgatgaagt tgtcttcgat gaatctaaag atgttctagt caagtactac | 1200 |
| gcccttggt gtggtcactg taagagaatg gctcctgctt atgaggaatt ggctactctt | 1260 |
| tacgccaatg atgaggatgc ctcttcaaag gttgtgattg caaaacttga tcacactttg | 1320 |
| aacgatgtcg acaacgttga tattcaaggt tatcctactt tgatccttta ccagctggt | 1380 |
| gataaatcca atcctcaact gtatgatgga tctcgtgacc tagaatcatt ggctgagttt | 1440 |
| gtaaaggaga gaggaaccca caaagtggat gccctagcac tcagaccagt cgaggaagaa | 1500 |
| aaggaagctg aagaagaagc tgaaagtgag gcagacgctc acgacgagct ttaa | 1554 |

<210> SEQ ID NO 20
<211> LENGTH: 517
<212> TYPE: PRT
<213> ORGANISM: Pichia

<400> SEQUENCE: 20

Met Gln Phe Asn Trp Asn Ile Lys Thr Val Ala Ser Ile Leu Ser Ala
1               5                   10                  15

Leu Thr Leu Ala Gln Ala Ser Asp Gln Glu Ala Ile Ala Pro Glu Asp
            20                  25                  30

Ser His Val Val Lys Leu Thr Glu Ala Thr Phe Glu Ser Phe Ile Thr
        35                  40                  45

```
Ser Asn Pro His Val Leu Ala Glu Phe Phe Ala Pro Trp Cys Gly His
    50                  55                  60

Cys Lys Lys Leu Gly Pro Glu Leu Val Ser Ala Glu Ile Leu Lys
65                  70                  75                  80

Asp Asn Glu Gln Val Lys Ile Ala Gln Ile Asp Cys Thr Glu Lys
                85                  90                  95

Glu Leu Cys Gln Gly Tyr Glu Ile Lys Gly Tyr Pro Thr Leu Lys Val
                100                 105                 110

Phe His Gly Glu Val Glu Val Pro Ser Asp Tyr Gln Gly Gln Arg Gln
            115                 120                 125

Ser Gln Ser Ile Val Ser Tyr Met Leu Lys Gln Ser Leu Pro Pro Val
    130                 135                 140

Ser Glu Ile Asn Ala Thr Lys Asp Leu Asp Asp Thr Ile Ala Glu Ala
145                 150                 155                 160

Lys Glu Pro Val Ile Val Gln Val Leu Pro Glu Asp Ala Ser Asn Leu
                165                 170                 175

Glu Ser Asn Thr Thr Phe Tyr Gly Val Ala Gly Thr Leu Arg Glu Lys
                180                 185                 190

Phe Thr Phe Val Ser Thr Lys Ser Thr Asp Tyr Ala Lys Lys Tyr Thr
            195                 200                 205

Ser Asp Ser Thr Pro Ala Tyr Leu Leu Val Arg Pro Gly Glu Glu Pro
    210                 215                 220

Ser Val Tyr Ser Gly Glu Glu Leu Asp Glu Thr His Leu Val His Trp
225                 230                 235                 240

Ile Asp Ile Glu Ser Lys Pro Leu Phe Gly Asp Ile Asp Gly Ser Thr
                245                 250                 255

Phe Lys Ser Tyr Ala Glu Ala Asn Ile Pro Leu Ala Tyr Tyr Phe Tyr
            260                 265                 270

Glu Asn Glu Glu Gln Arg Ala Ala Ala Asp Ile Ile Lys Pro Phe
    275                 280                 285

Ala Lys Glu Gln Arg Gly Lys Ile Asn Phe Val Gly Leu Asp Ala Val
    290                 295                 300

Lys Phe Gly Lys His Ala Lys Asn Leu Asn Met Asp Glu Glu Lys Leu
305                 310                 315                 320

Pro Leu Phe Val Ile His Asp Leu Val Ser Lys Lys Phe Gly Val
                325                 330                 335

Pro Gln Asp Gln Glu Leu Thr Asn Lys Asp Val Thr Glu Leu Ile Glu
            340                 345                 350

Lys Phe Ile Ala Gly Glu Ala Glu Pro Ile Val Lys Ser Glu Pro Ile
            355                 360                 365

Pro Glu Ile Gln Glu Glu Lys Val Phe Lys Leu Val Gly Lys Ala His
    370                 375                 380

Asp Glu Val Val Phe Asp Glu Ser Lys Asp Val Leu Val Lys Tyr Tyr
385                 390                 395                 400

Ala Pro Trp Cys Gly His Cys Lys Arg Met Ala Pro Ala Tyr Glu Glu
                405                 410                 415

Leu Ala Thr Leu Tyr Ala Asn Asp Glu Asp Ala Ser Ser Lys Val Val
                420                 425                 430

Ile Ala Lys Leu Asp His Thr Leu Asn Asp Val Asp Asn Val Asp Ile
            435                 440                 445

Gln Gly Tyr Pro Thr Leu Ile Leu Tyr Pro Ala Gly Asp Lys Ser Asn
    450                 455                 460
```

Pro Gln Leu Tyr Asp Gly Ser Arg Asp Leu Glu Ser Leu Ala Glu Phe
465                 470                 475                 480

Val Lys Glu Arg Gly Thr His Lys Val Asp Ala Leu Ala Leu Arg Pro
            485                 490                 495

Val Glu Glu Lys Glu Ala Glu Glu Ala Glu Ser Glu Ala Asp
            500                 505                 510

Ala His Asp Glu Leu
        515

<210> SEQ ID NO 21
<211> LENGTH: 498
<212> TYPE: DNA
<213> ORGANISM: Pichia

<400> SEQUENCE: 21
atggaattaa ccgcattgcg cagcagcaac cctaacacca tgatagacca accattgggc      60
cgtattgtct tcgagttata cgatgatgtt ccaaagacca ttgagaactt cagagctctg     120
tgtactggag agaagggtta cggtacaaa gactccattt ttcacagagt catccctcaa     180
ttcatgttgc aaggtggtga tttcaccaag ttcaacggaa ctggtggcaa atcaatctat     240
ggtgagaagt tcgctgacga gaacttcatc acaagcaca ccaagccagg tttgctgtca     300
atggctaacg ccggtccaaa caccaatggt tcccaatttt tcattaccac tgttccatgt     360
ccttggttag atggtaagca cgttgtattt ggtgaggtcg tcgacgggct ggacgttgtc     420
tccaagatcg agaccttggg atcatcttct ggtgctacca agacccagtt gaagatcacc     480
aactccggtg agttgtaa                                                   498

<210> SEQ ID NO 22
<211> LENGTH: 165
<212> TYPE: PRT
<213> ORGANISM: Pichia

<400> SEQUENCE: 22

Met Glu Leu Thr Ala Leu Arg Ser Ser Asn Pro Asn Thr Met Ile Asp
1               5                   10                  15

Gln Pro Leu Gly Arg Ile Val Phe Glu Leu Tyr Asp Asp Val Pro Lys
            20                  25                  30

Thr Ile Glu Asn Phe Arg Ala Leu Cys Thr Gly Glu Lys Gly Tyr Gly
        35                  40                  45

Tyr Lys Asp Ser Ile Phe His Arg Val Ile Pro Gln Phe Met Leu Gln
    50                  55                  60

Gly Gly Asp Phe Thr Lys Phe Asn Gly Thr Gly Gly Lys Ser Ile Tyr
65                  70                  75                  80

Gly Glu Lys Phe Ala Asp Glu Asn Phe Ile His Lys His Thr Lys Pro
                85                  90                  95

Gly Leu Leu Ser Met Ala Asn Ala Gly Pro Asn Thr Asn Gly Ser Gln
            100                 105                 110

Phe Phe Ile Thr Thr Val Pro Cys Pro Trp Leu Asp Gly Lys His Val
        115                 120                 125

Val Phe Gly Glu Val Val Asp Gly Leu Asp Val Val Ser Lys Ile Glu
    130                 135                 140

Thr Leu Gly Ser Ser Ser Gly Ala Thr Lys Thr Gln Leu Lys Ile Thr
145                 150                 155                 160

Asn Ser Gly Glu Leu
            165

<210> SEQ ID NO 23
<211> LENGTH: 2037
<212> TYPE: DNA
<213> ORGANISM: Pichia

<400> SEQUENCE: 23

```
atgctgtcgt taaaaccatc ttggctgact ttggcggcat taatgtatgc catgctattg      60
gtcgtagtgc catttgctaa acctgttaga gctgacgatg tcgaatctta tggaacagtg     120
attggtatcg atttgggtac cacgtactct tgtgtcggtg tgatgaagtc gggtcgtgta     180
gaaattcttg ctaatgacca aggtaacaga atcactcctt cctacgttag tttcactgaa     240
gacgagagac tggttggtga tgctgctaag aacttagctg cttctaaccc aaaaaacacc     300
atctttgata ttaagagatt gatcggtatg aagtatgatg ccccagaggt ccaaagagac     360
ttgaagcgtc ttccttacac tgtcaagagc aagaacggcc aacctgtcgt ttctgtcgag     420
tacaagggtg aggagaagtc tttcactcct gaggagattt ccgccatggt cttgggtaag     480
atgaagttga tcgctgagga ctacttagga agaaagtca ctcatgctgt cgttaccgtt      540
ccagcctact caacgacgc tcaacgtcaa gccactaagg atgccggtct catcgccggt     600
ttgactgttc tgagaattgt gaacgagcct accgccgctg cccttgctta cggtttggac     660
aagactggtg aggaaagaca gatcatcgtc tacgacttgg gtggaggaac cttcgatgtt     720
tctctgcttt ctattgaggg tggtgctttc gaggttcttg ctaccgccgg tgacacccac     780
ttgggtggtg aggactttga ctacagagtt gttcgccact tcgttaagat tttcaagaag     840
aagcataaca ttgacatcag caacaatgat aaggctttag gtaagctgaa gagagaggtc     900
gaaaaggcca gcgtactttt gtcttcccag atgactacca gaattgagat tgactctttc     960
gtcgacggta tcgacttctc tgagcaactg tctagagcta gtttgaggga gatcaacatt    1020
gaattattca agaagacact gaaaccagtt gaacaagtcc tcaaagacgc tggtgtcaag    1080
aaatctgaaa ttgatgacat tgtcttggtt ggtggttcta ccagaattcc aaaggttcaa    1140
caattattgg aggattactt tgacggaaag aaggcttcta gggaattaa cccagatgaa    1200
gctgtcgcat acggtgctgc tgttcaggct ggtgttttgt ctggtgagga aggtgtcgat    1260
gacatcgtct tgcttgatgt gaaccccta actctgggta tcgagactac tggtggcgtt    1320
atgactacct taatcaacag aaacactgct atcccaacta gaaatctca aattttctcc    1380
actgctgctg acaaccagcc aactgtgttg attcaagttt atgagggtga gagagccttg    1440
gctaaggaca caacttgct tggtaaattc gagctgactg gtattccacc agctccaaga    1500
ggtactcctc aagttgaggt tactttgtt ttagacgcta acggaatttt gaaggtctct    1560
gccaccgata agggaactgg aaaatccgag tccatcacca tcaacaatga tcgtggtaga    1620
ttgtccaagg aggaggttga ccgtatggtt gaagaggccg agaagtacgc cgctgaggat    1680
gctgcactaa gagaaaagat tgaggctaga acgctctgg agaactacgc tcattccctt     1740
aggaaccaag ttactgatga ctctgaaacc gggcttggtt ctaaattgga cgaggacgac    1800
aaagagacat tgacagatgc catcaaagat accctagagt tcttggaaga caacttcgac    1860
accgcaacca ggaagaatt agacgaacaa agagaaaagc tttccaagat tgcttaccca    1920
atcacttcta agctatacgg tgctccagag ggtggtactc cacctggtgg tcaaggtttt    1980
gacgatgatg atggagactt tgactacgac tatgactatg atcatgatga gttgtag       2037
```

<210> SEQ ID NO 24
<211> LENGTH: 678

<212> TYPE: PRT
<213> ORGANISM: Pichia

<400> SEQUENCE: 24

Met Leu Ser Leu Lys Pro Ser Trp Leu Thr Leu Ala Ala Leu Met Tyr
1               5                   10                  15

Ala Met Leu Leu Val Val Pro Phe Ala Lys Pro Val Arg Ala Asp
            20                  25                  30

Asp Val Glu Ser Tyr Gly Thr Val Ile Gly Ile Asp Leu Gly Thr Thr
            35                  40                  45

Tyr Ser Cys Val Gly Val Met Lys Ser Gly Arg Val Glu Ile Leu Ala
50                      55                  60

Asn Asp Gln Gly Asn Arg Ile Thr Pro Ser Tyr Val Ser Phe Thr Glu
65                  70                  75                  80

Asp Glu Arg Leu Val Gly Asp Ala Ala Lys Asn Leu Ala Ala Ser Asn
                85                  90                  95

Pro Lys Asn Thr Ile Phe Asp Ile Lys Arg Leu Ile Gly Met Lys Tyr
            100                 105                 110

Asp Ala Pro Glu Val Gln Arg Asp Leu Lys Arg Leu Pro Tyr Thr Val
        115                 120                 125

Lys Ser Lys Asn Gly Gln Pro Val Val Ser Val Glu Tyr Lys Gly Glu
130                 135                 140

Glu Lys Ser Phe Thr Pro Glu Glu Ile Ser Ala Met Val Leu Gly Lys
145                 150                 155                 160

Met Lys Leu Ile Ala Glu Asp Tyr Leu Gly Lys Val Thr His Ala
            165                 170                 175

Val Val Thr Val Pro Ala Tyr Phe Asn Asp Ala Gln Arg Gln Ala Thr
                180                 185                 190

Lys Asp Ala Gly Leu Ile Ala Gly Leu Thr Val Leu Arg Ile Val Asn
        195                 200                 205

Glu Pro Thr Ala Ala Ala Leu Ala Tyr Gly Leu Asp Lys Thr Gly Glu
    210                 215                 220

Glu Arg Gln Ile Ile Val Tyr Asp Leu Gly Gly Gly Thr Phe Asp Val
225                 230                 235                 240

Ser Leu Leu Ser Ile Glu Gly Gly Ala Phe Glu Val Leu Ala Thr Ala
                245                 250                 255

Gly Asp Thr His Leu Gly Gly Glu Asp Phe Asp Tyr Arg Val Val Arg
            260                 265                 270

His Phe Val Lys Ile Phe Lys Lys Lys His Asn Ile Asp Ile Ser Asn
        275                 280                 285

Asn Asp Lys Ala Leu Gly Lys Leu Arg Glu Val Glu Lys Ala Lys
    290                 295                 300

Arg Thr Leu Ser Ser Gln Met Thr Thr Arg Ile Glu Ile Asp Ser Phe
305                 310                 315                 320

Val Asp Gly Ile Asp Phe Ser Glu Gln Leu Ser Arg Ala Lys Phe Glu
                325                 330                 335

Glu Ile Asn Ile Glu Leu Phe Lys Lys Thr Leu Lys Pro Val Glu Gln
            340                 345                 350

Val Leu Lys Asp Ala Gly Val Lys Lys Ser Glu Ile Asp Ile Val
        355                 360                 365

Leu Val Gly Gly Ser Thr Arg Ile Pro Lys Val Gln Gln Leu Leu Glu
370                 375                 380

Asp Tyr Phe Asp Gly Lys Lys Ala Ser Lys Gly Ile Asn Pro Asp Glu
385                 390                 395                 400

-continued

```
Ala Val Ala Tyr Gly Ala Ala Val Gln Ala Gly Val Leu Ser Gly Glu
            405                 410                 415
Glu Gly Val Asp Asp Ile Val Leu Leu Asp Val Asn Pro Leu Thr Leu
            420                 425                 430
Gly Ile Glu Thr Thr Gly Gly Val Met Thr Thr Leu Ile Asn Arg Asn
            435                 440                 445
Thr Ala Ile Pro Thr Lys Lys Ser Gln Ile Phe Ser Thr Ala Ala Asp
    450                 455                 460
Asn Gln Pro Thr Val Leu Ile Gln Val Tyr Glu Gly Glu Arg Ala Leu
465                 470                 475                 480
Ala Lys Asp Asn Asn Leu Leu Gly Lys Phe Glu Leu Thr Gly Ile Pro
                485                 490                 495
Pro Ala Pro Arg Gly Thr Pro Gln Val Glu Val Thr Phe Val Leu Asp
            500                 505                 510
Ala Asn Gly Ile Leu Lys Val Ser Ala Thr Asp Lys Gly Thr Gly Lys
            515                 520                 525
Ser Glu Ser Ile Thr Ile Asn Asn Asp Arg Gly Arg Leu Ser Lys Glu
        530                 535                 540
Glu Val Asp Arg Met Val Glu Glu Ala Glu Lys Tyr Ala Ala Glu Asp
545                 550                 555                 560
Ala Ala Leu Arg Glu Lys Ile Glu Ala Arg Asn Ala Leu Glu Asn Tyr
                565                 570                 575
Ala His Ser Leu Arg Asn Gln Val Thr Asp Asp Ser Glu Thr Gly Leu
                580                 585                 590
Gly Ser Lys Leu Asp Glu Asp Asp Lys Glu Thr Leu Thr Asp Ala Ile
            595                 600                 605
Lys Asp Thr Leu Glu Phe Leu Glu Asp Asn Phe Asp Thr Ala Thr Lys
    610                 615                 620
Glu Glu Leu Asp Glu Gln Arg Glu Lys Leu Ser Lys Ile Ala Tyr Pro
625                 630                 635                 640
Ile Thr Ser Lys Leu Tyr Gly Ala Pro Glu Gly Gly Thr Pro Pro Gly
                645                 650                 655
Gly Gln Gly Phe Asp Asp Asp Gly Asp Phe Asp Tyr Asp Tyr Asp
            660                 665                 670
Tyr Asp His Asp Glu Leu
        675
```